United States Patent
Nitta et al.

(10) Patent No.: US 8,577,553 B2
(45) Date of Patent: Nov. 5, 2013

(54) LATERAL MOTION CONTROL APPARATUS FOR A VEHICLE

(75) Inventors: Hirofumi Nitta, Obu (JP); Yuichi Mizutani, Aichi-ken (JP); Mitsuhiro Tokimasa, Obu (JP); Junpei Tatsukawa, Chiryu (JP); Yasuhiko Mukai, Anjo (JP); Yoshihisa Ogata, Chiryu (JP); Hajime Kumabe, Kariya (JP); Masatoshi Hanzawa, Kariya (JP); Masaki Maruyama, Nagoya (JP)

(73) Assignees: Aisin Seiki Kabushiki Kaisha, Kariya-Shi, Aichi-Ken (JP); Denso Corporation, Kariya, Aichi-Pref. (JP); Advics Co., Ltd., Kariya, Aichi-Pref. (JP)

( * ) Notice: Subject to any disclaimer, the term of this patent is extended or adjusted under 35 U.S.C. 154(b) by 35 days.

(21) Appl. No.: 13/282,766

(22) Filed: Oct. 27, 2011

(65) Prior Publication Data
US 2012/0109415 A1 May 3, 2012

(30) Foreign Application Priority Data
Oct. 29, 2010 (JP) ................................ 2010-243413

(51) Int. Cl.
*A01B 69/00* (2006.01)
*B62D 6/00* (2006.01)
*B62D 5/04* (2006.01)
*B60G 17/018* (2006.01)

(52) U.S. Cl.
USPC .................. 701/42; 701/41; 701/37; 180/446

(58) Field of Classification Search
USPC ........................... 701/37, 38, 41, 42; 180/446
See application file for complete search history.

(56) References Cited

U.S. PATENT DOCUMENTS

| 6,553,293 B1 * | 4/2003 | Hac ................................ 701/42 |
| 7,143,864 B2 * | 12/2006 | Mattson et al. ................. 180/446 |
| 7,212,901 B2 * | 5/2007 | Sadano et al. ................... 701/70 |
| 7,571,039 B2 * | 8/2009 | Chen et al. ...................... 701/38 |
| 2008/0183353 A1 * | 7/2008 | Post et al. ........................ 701/42 |
| 2009/0030572 A1 * | 1/2009 | Takahashi et al. ............... 701/41 |

FOREIGN PATENT DOCUMENTS

JP  2003-081115 A  3/2003

* cited by examiner

*Primary Examiner* — Thomas Black
*Assistant Examiner* — Tyler Paige
(74) *Attorney, Agent, or Firm* — Buchanan Ingersoll & Rooney PC

(57) ABSTRACT

A lateral motion control apparatus for a vehicle includes a control stop determination unit that determines whether or not to stop the control for the control target by the control target control unit based on a steering operation amount inputted by a driver of the vehicle, and a degeneration control amount determination unit that determines a degeneration control amount for the control target such that the control amount for the control target degenerates after the time when the control stop determination unit has determined that the control for the control target is to be stopped. When the control stop determination unit has determined that the control for the control target is to be stopped, the control target control unit controls the control target based on the degeneration control amount determined by the degeneration control amount determination unit.

8 Claims, 16 Drawing Sheets

LATERAL MOTION CONTROL APPARATUS FOR A VEHICLE

TECHNICAL FIELD

This disclosure relates to lateral motion control apparatuses that control the lateral motion, such as the yaw rate, of vehicles.

BACKGROUND DISCUSSION

In recent years, driving assistance apparatuses (called "driving assistance applications" hereinafter) that assist in the driving of a moving vehicle are being developed. For example, lane keep apparatuses that automatically steer or assist in driving so that vehicles travel along a road, lane departure prevention apparatuses that assist in driving by preventing vehicles from departing from their lanes, emergency avoidance apparatuses that automatically steer vehicles in order to avoid obstructions on the traveled road surface, and so on are being developed.

Request signals outputted from a driving assistance application such as a lane keep apparatus, a lane departure prevention apparatus, or an emergency avoidance apparatus (for example, a signal indicating a target lateral acceleration) are inputted into a lateral motion control apparatus that controls the amount of lateral motion (for example, the yaw rate) of the vehicle. Control signals are outputted from the control apparatus to a control target such as an actuator. The lateral motion of the vehicle is controlled as a result of the control target being controlled based on the control signals.

In the case where a driver has performed steering operations while the lateral motion of the vehicle is being controlled by the lateral motion control apparatus based on a request signal outputted from a driving assistance application (such interventional steering performed by the driver will be called "overriding"), the lateral motion control performed by the lateral motion control apparatus is stopped in order to give priority to the steering operations performed by the driver.

JP2003-81115A discloses a lane departure prevention apparatus that determines that an override is occurring in the case where a steering angle θ is greater than or equal to a set steering angle θ1 after a set time T1 has passed after a steering angle velocity absolute value |dθ| becoming greater than or equal to a set threshold value dθ1. According to this apparatus, it is determined that an override is not occurring if the steering angle θ is less than the set steering angle θ1 after T1 has passed even if the steering angle velocity absolute value |dθ| is greater than or equal to the threshold value dθ1, which prevents the control of the lateral motion amount of the vehicle from being stopped when the steering angle velocity has temporarily exceeded the set threshold value due to the influence of disturbances or the like. Furthermore, JP2003-81115A also discloses a lane departure response apparatus that changes the set threshold value used in the determination as to whether or not an override is occurring based on the position of the vehicle in a lane, the curvature factor during a turn, and so on.

SUMMARY

In the case where an override is generated during lateral motion control by a lateral motion control apparatus, the lateral motion control is stopped. However, if the lateral motion control is immediately stopped, the behavior of a vehicle will become unstable and a sense of discomfort will be imparted upon the driver. Thus, a need exists for a lateral motion control apparatus which is not susceptible to the drawback mentioned above.

According to the aspect of this disclosure, a lateral motion control apparatus (40) includes: a target value obtaining unit (411) that obtains a target value (γ*) for a lateral motion amount of a vehicle; a control amount calculation unit (414, 415, 416) that calculates a control amount for a control target (14, 22, 32) controlled so as to change the lateral motion amount of the vehicle based on the target value of the lateral motion amount obtained by the target value obtaining unit; a control target control unit (42, 43, 44) that controls the control target based on the control amount; a control stop determination unit (417, 4162a) that determines whether or not to stop the control for the control target by the control target control unit based on a steering operation amount (τs) inputted by a driver of the vehicle; and a degeneration control amount determination unit (4162b) that determines a degeneration control amount for the control target such that the control amount for the control target degenerates after the time when the control stop determination unit has determined that the control for the control target is to be stopped. And when the control stop determination unit has determined that the control for the control target is to be stopped, the control target control unit controls the control target based on the degeneration control amount determined by the degeneration control amount determination unit.

BRIEF DESCRIPTION OF THE DRAWINGS

The foregoing and additional features and characteristic of this disclosure will become more apparent from the following detailed description considered with the reference to the accompanying drawings, wherein.

DETAILED DESCRIPTION

First Embodiment

Figure 1:
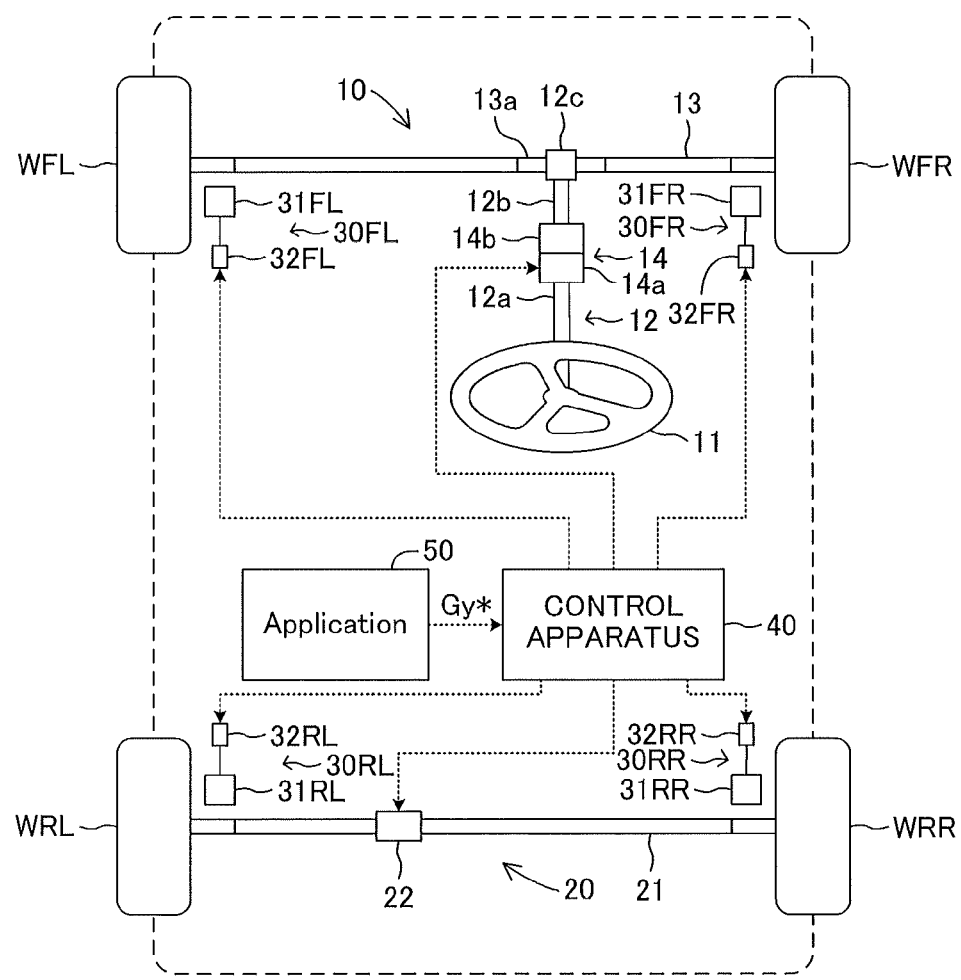
FIG. 1 is a schematic diagram illustrating a vehicle in which a lateral motion control apparatus according to an embodiment is installed.

Hereinafter, a first embodiment disclosed here will be described with reference to the drawings. FIG. 1 is a schematic diagram illustrating a vehicle in which a lateral motion control apparatus according to the present embodiment is installed. As shown in FIG. 1, this vehicle includes a front steering apparatus 10, a rear steering apparatus 20, and braking apparatuses (a right-front wheel braking apparatus 30FR, a left-front wheel braking apparatus 30FL, a right-rear wheel braking apparatus 30RR, and a left-rear wheel braking apparatus 30RL). The front steering apparatus 10 applies a steering force to a right-front wheel WFR and a left-front wheel WFL, thus steering (turning) those wheels. The rear steering apparatus 20 applies a steering force to a right-rear wheel WRR and a left-rear wheel WRL, thus steering (turning) those wheels. The right-front wheel braking apparatus 30FR applies a braking force on the right-front wheel WFR. The left-front wheel braking apparatus 30FL applies a braking force on the left-front wheel WFL. The right-rear wheel braking apparatus 30RR applies a braking force on the right-rear wheel WRR. The left-rear wheel braking apparatus 30RL applies a braking force on the left-rear wheel WRL.

The front steering apparatus 10 includes a steering wheel 11, a steering shaft 12, a front-wheel steering rack 13, and a front steering actuator 14. The steering shaft 12 has an input-side steering shaft 12a and an output-side steering shaft 12b.

The input-side steering shaft 12a is connected at one end (the upper end) to the steering wheel 11, and rotates axially in response to an operation that rotates the steering wheel 11. In addition, the input-side steering shaft 12a is linked at its other end (the lower end) to one end of the output-side steering shaft 12b via the front steering actuator 14. Accordingly, the rotational force of the input-side steering shaft 12a is transmitted to the output-side steering shaft 12b via the front steering actuator 14. A pinion gear 12c is formed in the other end (the lower end) of the output-side steering shaft 12b. Furthermore, a rack gear 13a that engages with the pinion gear 12c is formed in the front-wheel steering rack 13. A rack and pinion mechanism is thus configured by the pinion gear 12c and the rack gear 13a. This rack and pinion mechanism converts the rotational force of the output-side steering shaft 12b into linear force of the front-wheel steering rack 13. Accordingly, when the driver rotates the steering wheel 11, the front-wheel steering rack 13 moves in the linear direction.

The ends of the front-wheel steering rack 13 are connected to the left-front wheel WFL and the right-front wheel WFR, respectively, via tie rods. Therefore, the front wheels are steered when the driver rotates the steering wheel 11 and the front-wheel steering rack 13 moves in the linear direction.

Meanwhile, the front steering actuator 14 includes a first actuator 14a and a second actuator 14b. The first actuator 14a is configured of, for example, a reducer and an electric motor. The first actuator 14a is attached to the input-side steering shaft 12a via, for example, a gear mechanism. The input-side steering shaft 12a is rotated as a result of the first actuator 14a rotating. Therefore, the front wheels can be steered automatically by driving the first actuator 14a even if the driver is not rotating the steering wheel 11. The first actuator 14a can also generate an assistance force for aiding the driver in rotating the steering wheel.

The second actuator 14b can be configured of, for example, a reducer and an electric motor. In this case, the casing of the electric motor is linked to the one end (the lower end) of the input-side steering shaft 12a, and the rotor of the electric motor is linked to the output-side steering shaft 12b via the reducer. Accordingly, when the input-side steering shaft 12a rotates, that rotational force is transmitted to the output-side steering shaft 12b via the second actuator 14b. Furthermore, when the second actuator 14b rotates, the output-side steering shaft 12b is rotated and the front wheels are automatically steered without the input-side steering shaft 12a rotating.

The rear steering apparatus 20 includes a rear-wheel steering rack 21 and a rear steering actuator 22. The rear-wheel steering rack 21 is connected to the left-rear wheel WRL and the right-rear wheel WRR. The rear steering actuator 22 is attached to the rear-wheel steering rack 21. The rear steering actuator 22 is configured of, for example, an electric motor and a ball screw mechanism. The ball screw mechanism has a ball screw nut and a ball screw rod. The ball screw rod forms part of the rear-wheel steering rack 21. The ball screw nut is linked to the rotor of the electric motor so as to be capable of rotating integrally therewith. When the ball screw nut rotates due to the rotation of the electric motor, that rotational force is converted by the ball screw mechanism into linear force of the rear-wheel steering rack 21. Therefore, the rear-wheel steering rack 21 moves in the linear direction due to the driving of the rear steering actuator 22, thus automatically steering (turning) the rear wheels.

The braking apparatuses 30FR, 30FL, 30RR, and 30RL include braking mechanisms 31FR, 31FL, 31RR, and 31RL, respectively, for applying braking forces for the respective wheels WFR, WFL, WRR, and WRL. The braking mechanisms 31FR, 31FL, 31RR, and 31RL operate in response to the driver depressing a brake pedal. The braking mechanisms 31FR, 31FL, 31RR, and 31RL can be configured of, for example, disc rotors that rotate coaxially with the wheels WFR, WFL, WRR, and WRL, brake pads disposed so as to be capable of making contact with the disc rotors, pistons that apply a compressive force to the brake pads, hydraulic circuits that transmit, to the pistons, the depressive force applied to the brake pedal boosted by a brake booster (not shown), and so on.

DYC (Dynamic Yaw Control) actuators 32FR, 32FL, 32RR, and 32RL are attached to the braking mechanisms 31FR, 31FL, 31RR, and 31RL. The DYC actuators are actuators that can apply a braking force or a driving force to the individual wheels. In the present embodiment, the DYC actuators are brake actuators that can apply a braking force to the individual wheels. The braking mechanisms 31FR, 31FL, 31RR, and 31RL are operated due to the operation of the DYC actuators 32FR, 32FL, 32RR, and 32RL, thus applying braking forces to the wheels WFR, WFL, WRR, and WRL independently. The DYC actuators 32FR, 32FL, 32RR, and 32RL operate independently from the depression of the brake pedal when control signals are issued from a lateral motion control apparatus, which will be discussed later. Braking forces are applied automatically to the wheels WFR, WFL, WRR, and WRL as a result. The DYC actuators 32FR, 32FL, 32RR, and 32RL can be configured of, for example, pressure pumps, pressurizing valves and depressurizing valves interposed within the aforementioned hydraulic circuit, or the like. Hereinafter, when referring collectively to the DYC actuators 32FR, 32FL, 32RR, and 32RL, or when specifying a single or multiple DYC actuators 32FR, 32FL, 32RR, and 32RL, the term "DYC actuator 32" will be used.

Although in this embodiment, the DYC actuator 32 is an actuator for applying a braking force to individual wheels, it should be noted that the DYC actuator 32 may be an actuator for applying a driving force or a regenerative braking force to the individual wheels. For example, if the vehicle is provided with in-wheel type motors, the in-wheel type motors may be DYC actuators.

The front steering actuator 14, the rear steering actuator 22, and the DYC actuator 32 are electrically connected to a lateral motion control apparatus 40, respectively. The lateral motion control apparatus 40 is configured of a microcomputer including a ROM, a RAM, and a CPU, and outputs operation signals to the respective actuators, thus carrying out integrated control of the lateral motion of the vehicle.

In addition, this vehicle is provided with a driving assistance application 50. The driving assistance application 50 calculates a lateral acceleration (target lateral acceleration) Gy* required by the present traveling vehicle for traveling along its lane. The target lateral acceleration Gy* calculated by the driving assistance application 50 is inputted into the lateral motion control apparatus 40. The lateral motion control apparatus 40 outputs operation signals to the respective actuators 14, 22, and 32 based on the inputted target lateral acceleration Gy*.

Figure 2:
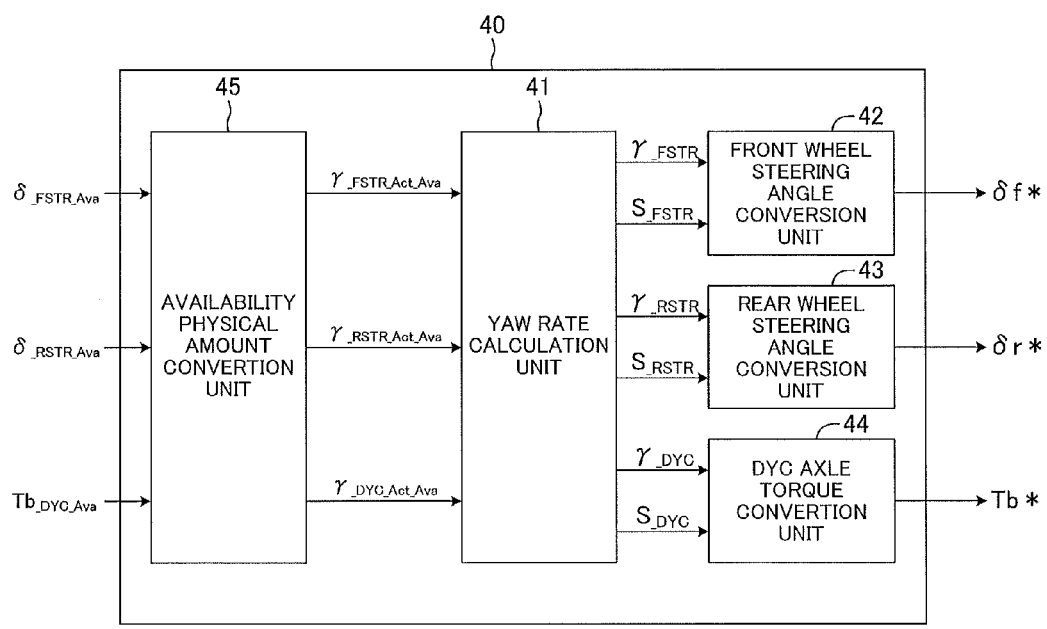
FIG. 2 is a diagram illustrating the functional configuration of a lateral motion control apparatus.

FIG. 2 is a diagram illustrating the functional configuration of the lateral motion control apparatus 40. The lateral motion control apparatus 40 according to the present embodiment controls the yaw rate of the vehicle. As shown in FIG. 2, the lateral motion control apparatus 40 includes an availability physical amount conversion unit 45, a yaw rate calculation unit 41, a front-wheel steering angle conversion unit 42, a rear-wheel steering conversion unit 43, and a DYC axle torque conversion unit 44.

The availability physical amount conversion unit 45 takes, as its inputs, a front steering availability steering angle $\delta_{\_FSTR\_Ava}$, a rear steering availability steering angle $\delta_{\_RSTR\_Ava}$, and a DYC availability torque $Tb_{\_DYC\_Ava}$. The front steering availability steering angle $\delta_{\_FSTR\_Ava}$ indicates a steering (turning) angular amount by which the front wheels can be steered (turned) from a current steering (turning) state by operation (actuation) of the front steering actuator 14. The rear steering availability steering angle $\delta_{\_RSTR\_Ava}$ indicates a steering (turning) angular amount by which the rear wheels can be steered (turned) from a current steering (turning) state by operation (actuation) of the rear steering actuator 22. The DYC availability torque $Tb_{\_DYC\_Ava}$ indicates an axle torque amount that can be applied to an axle controlled by operation (actuation) of the DYC actuator 32.

The front steering availability steering angle $\delta_{\_FSTR\_Ava}$ can be found based on the current steering (turning) angle of the front wheels and the maximum steering (turning) angle of the front wheels. The rear steering availability steering angle $\delta_{\_RSTR\_Ava}$ can be found based on the current steering (turning) angle of the rear wheels and the maximum steering (turning) angle of the rear wheels. The DYC availability torque $Tb_{\_DYC\_Ava}$ can be found based on the axle torque currently acting on an axle and the maximum value of the axle torque that can act on that axle.

In addition, the availability physical amount conversion unit 45 calculates a front steering availability theoretical yaw rate $\gamma_{\_FSTR\_Act\_Ava}$, a rear steering availability theoretical yaw rate $\gamma_{\_RSTR\_Act\_Ava}$, and a DYC availability theoretical yaw rate $\gamma_{\_DYC\_Act\_Ava}$ based on the inputted front steering availability steering angle $\delta_{\_FSTR\_Ava}$, rear steering availability steering angle $\delta_{\_RSTR\_Ava}$, and DYC availability torque $Tb_{\_DYC\_Ava}$. The availability theoretical yaw rates calculated by the availability physical amount conversion unit 45 are outputted to the yaw rate calculation unit 41. The front steering availability theoretical yaw rate $\gamma_{\_FSTR\_Act\_Ava}$ indicates a maximum value (or range) for the yaw rate that can theoretically be elicited when the steering angle of the front wheels changes within a range represented by the front steering availability steering angle $\delta_{\_FSTR\_Ava}$. The rear steering availability theoretical yaw rate $\gamma_{\_RSTR\_Act\_Ava}$ indicates a maximum value (or range) for the yaw rate that can theoretically be elicited when the steering angle of the rear wheels changes within a range represented by the rear steering availability steering angle $\delta_{\_RSTR\_Ava}$. The DYC availability theoretical yaw rate $\gamma_{\_DYC\_Act\_Ava}$ indicates a maximum value (or range) for the yaw rate that can theoretically be elicited when the axle torque changes within a range represented by the DYC availability torque $Tb_{\_DYC\_Ava}$.

The yaw rate calculation unit 41 calculates a front steering yaw rate control amount $\gamma_{\_FSTR}$ (where FSTR indicates the front steering actuator 14), a rear steering yaw rate control amount $\gamma_{\_RSTR}$ (where RSTR indicates the rear steering actuator 22), and a DYC yaw rate control amount $\gamma_{\_DYC}$ (where DYC indicates the DYC actuator 32), based on the target lateral acceleration Gy* inputted from the driving assistance application 50, and outputs these yaw rate control amounts. The front steering yaw rate control amount $\gamma_{\_FSTR}$ is a target control amount for the yaw rate elicited in the vehicle when the front steering actuator 14 operates and steers the front wheels. The rear steering yaw rate control amount $\gamma_{\_RSTR}$ is a target control amount for the yaw rate elicited in the vehicle when the rear steering actuator 22 operates and steers the rear wheels. The DYC yaw rate control amount $\gamma_{\_DYC}$ is a target control amount for the yaw rate elicited in the vehicle when the DYC actuator 32 operates and applies a braking force to one of the wheels, and in particular, to one of the right-rear wheel WRR and left-rear wheel WRL.

The yaw rate calculation unit 41 outputs a front steering actuation request signal $S_{\_FSTR}$, a rear steering actuation request signal $S_{\_RSTR}$, and a DYC actuation request signal $S_{\_DYC}$. The front steering actuation request signal $S_{\_FSTR}$ is a signal for requesting the front steering actuator 14 to operate for yaw rate control. The rear steering actuation request signal $S_{\_RSTR}$ is a signal for requesting the rear steering actuator 22 to operate for yaw rate control. The DYC actuation request signal $S_{\_DYC}$ is a signal for requesting the DYC actuator 32 to operate for yaw rate control.

Figure 3:
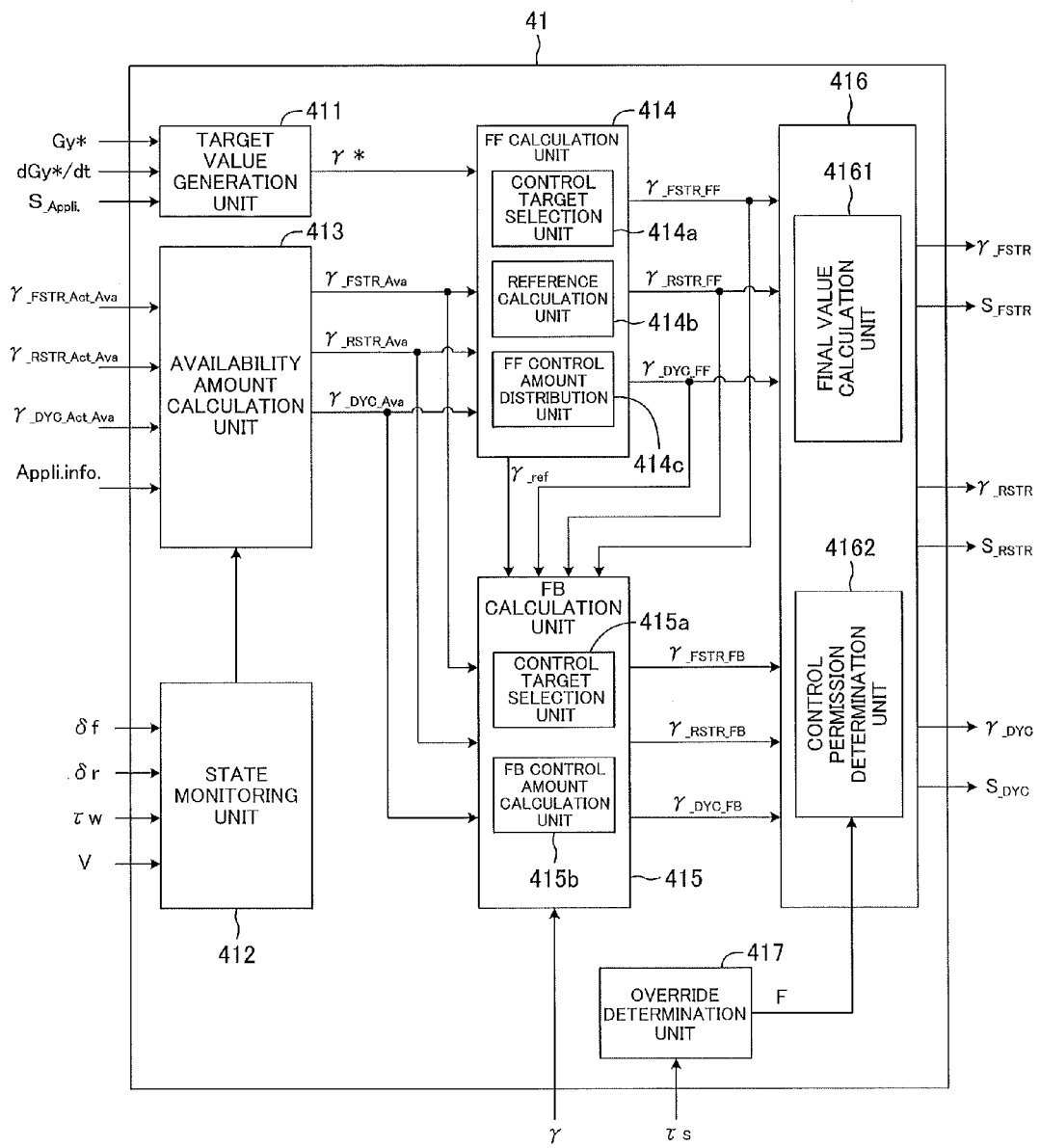
FIG. 3 is a diagram illustrating the functional configuration of a yaw rate calculation unit.

FIG. 3 is a diagram illustrating the functional configuration of the yaw rate calculation unit 41. As shown in FIG. 3, the yaw rate calculation unit 41 includes a target value generation unit 411, a state monitoring unit 412, an availability amount calculation unit 413, a feed-forward (FF) calculation unit 414, a feedback (FB) calculation unit 415, a resolution unit 416, and an override determination unit 417.

The target value generation unit 411 takes, as its input, the target lateral acceleration Gy* from the driving assistance application 50, and calculates a target yaw rate γ* to be elicited in the vehicle based on the inputted target lateral acceleration Gy* so that the lateral acceleration acting on the vehicle becomes the target lateral acceleration Gy*. The target yaw rate γ* can be calculated by, for example, dividing the target lateral acceleration Gy* by a vehicle speed V and then subtracting, from that value, a time derivative value of a vehicle body slip angle β (dβ/dt). In addition, the target value generation unit 411 may take, as its input, a change amount of the target lateral acceleration Gy* (dGy*/dt), an application execution request signal $S_{\_Appli.}$, and so on from the driving assistance application 50. The target lateral acceleration change amount dGy*/dt is used in order to calculate the target yaw rate γ*. The application execution request signal $S_{\_Appli.}$ is a signal for requesting the yaw rate to be controlled based on the target lateral acceleration Gy* outputted from the driving assistance application 50.

The state monitoring unit 412 takes, as its inputs, a front wheel steering angle δf from a front wheel steering angle sensor attached to the vehicle, a rear wheel steering angle δr from a rear wheel steering angle sensor, a wheel torque τw of each of the wheels from torque sensors attached to the respective wheels, and the vehicle speed V from a vehicle speed sensor. The state monitoring unit 412 estimates the current state of the vehicle based on the inputted information, and outputs a vehicle generation limit physical amount representing the estimated state of the vehicle (for example, a vehicle generation limit yaw rate). In vehicle motion control, it is important to determine whether or not lateral motion is occurring in the light of safety, and to estimate the elicited lateral motion amount in the light of performance. Therefore the state monitoring unit 412 outputs one or more of cornering powers Cfr, Cfl, Crr, and Crl for the respective wheels, a yaw rate, a lateral acceleration, a road surface μ, and a slip rate s that can occur in the vehicle as benchmarks indicating the estimated state of the vehicle (a vehicle generation limit physical amount). The amount of outputted information may be selected as appropriate based on the capabilities of the application, the sensors attached to the vehicle, and so on; and not particularly limited thereto.

The availability amount calculation unit 413 takes, as its input, the current state of the vehicle from the state monitoring unit 412. The availability amount calculation unit 413 also takes as inputs the front steering availability theoretical yaw rate $\gamma_{\_FSTR\_Act\_Ava}$, the rear steering availability theoretical yaw rate $\gamma_{\_RSTR\_Act\_Ava}$, and the DYC availability theoretical yaw rate $\gamma_{\_DYC\_Act\_Ava}$. Furthermore, the availability amount calculation unit 413 takes application information from the driving assistance application 50 as an input. The application information is, for example, information indicating whether or not the actuators can be used, or information representing yaw rate control characteristics.

The availability amount calculation unit 413 then calculates a front steering availability yaw rate $\gamma_{\_FSTR\_Ava}$ a rear steering availability yaw rate $\gamma_{\_RSTR\_Ava}$, and a DYC availability yaw rate $\gamma_{\_DYC\_Ava}$ based on the aforementioned vehicle generation limit physical amount representing the vehicle state, the front steering availability theoretical yaw rate $\gamma_{\_FSTR\_Act\_Ava}$, the rear steering availability theoretical yaw rate $\gamma_{\_RSTR\_Act\_Ava}$, the DYC availability theoretical yaw rate $\gamma_{\_DYC\_Act\_Ava}$ and the application information.

The front steering availability yaw rate $\gamma_{\_FSTR\_Ava}$ indicates a maximum value (or range) for the yaw rate that can actually be elicited in the vehicle when the front steering actuator 14 operates, in the case where the vehicle generation limit physical amount representing the vehicle state and the application information are taken into consideration. The rear steering availability yaw rate $\gamma_{\_RSTR\_Ava}$ indicates a maximum value (or range) for the yaw rate that can actually be elicited in the vehicle when the rear steering actuator 22 operates, in the case where the vehicle generation limit physical amount representing the vehicle state and the application information are taken into consideration. The DYC availability yaw rate $\gamma_{\_DYC\_Ava}$ indicates a maximum value (or range) for the yaw rate that can actually be elicited in the vehicle when the DYC actuator 32 operates, in the case where the vehicle generation limit physical amount representing the vehicle state and the application information are taken into consideration. A table that represents correspondence relationships between the various availability yaw rates, the vehicle generation limit physical amount representing the vehicle state, the front steering availability theoretical yaw rate $\gamma_{\_FSTR\_Act\_Ava}$, the rear steering availability theoretical yaw rate $\gamma_{\_RSTR\_Act\_Ava}$, the DYC availability theoretical yaw rate $\gamma_{\_DYC\_Act\_Ava}$, and so on is stored in the availability amount calculation unit 413. The respective availability yaw rates are calculated based on the various pieces of inputted information by referring to the above-mentioned table.

The feed-forward calculation unit 414 takes, as its inputs, the target yaw rate γ* and the respective availability yaw rates (the front steering availability yaw rate $\gamma_{\_FSTR\_Ava}$, the rear steering availability yaw rate $\gamma_{\_RSTR\_Ava}$, and the DYC availability yaw rate $\gamma_{\_DYC\_Ava}$). Meanwhile, the feed-forward calculation unit 414 includes a control target selection unit 414a, a reference calculation unit 414b, and a feed-forward control amount distribution unit 414c.

The control target selection unit 414a selects an actuator (control target) that can be used in the vehicle yaw rate control based on the respective availability yaw rates. The control target selection unit 414a determines a priority order for the usable actuators. In this case, for example, when application information representing emphasis on the responsiveness of yaw rate control is inputted into the availability amount calculation unit 413, the priority order is determined so that the actuator with the fastest response (for example, the DYC actuator 32) has the highest priority, the actuator with the next-fastest response (for example, the front steering actuator 14) has the second-highest priority, and the actuator with the slowest response (for example, the rear steering actuator 22) has the third-highest priority.

The reference calculation unit 414b takes as an input the target yaw rate γ* from the target value generation unit 411, and calculates a feed-forward yaw rate reference amount $\gamma_{\_ref}$ that simulates vehicle response delay by executing a reference calculation on the target yaw rate γ*. Because it is used in feedback calculation, the feed-forward yaw rate reference amount $\gamma_{\_ref}$ is outputted to the feedback calculation unit 415.

The feed-forward control amount distribution unit 414c distributes a feed-forward yaw rate control amount $\gamma_{\_FF}$ calculated based on the feed-forward yaw rate reference amount $\gamma_{\_ref}$ calculated by the reference calculation unit 414b as a front steering feed-forward yaw rate control amount $\gamma_{\_FSTR\_FF}$, a rear steering feed-forward yaw rate control amount $\gamma_{\_RSTR\_FF}$, and a DYC feed-forward yaw rate control amount $\gamma_{\_DYC\_FF}$. The front steering feed-forward yaw rate control amount $\gamma_{\_FSTR\_FF}$ is a feed-forward control amount for a yaw rate elicited in the vehicle by actuating the front steering actuator 14. The rear steering feed-forward yaw rate control amount $\gamma_{\_RSTR\_FF}$ is a feed-forward control amount for a yaw rate elicited in the vehicle by actuating the rear steering actuator 22. The DYC feed-forward yaw rate control amount $\gamma_{\_DYC\_FF}$ is a feed-forward control amount for a yaw rate elicited in the vehicle by actuating the DYC actuator 32.

In this case, the feed-forward control amount distribution unit 414c distributes the feed-forward yaw rate control amount $\gamma\_{FF}$ based on the priority order determined by the control target selection unit 414a and the respective availability yaw rates. For example, in the case where the calculated feed-forward yaw rate control amount $\gamma\_{FF}$ is 10, the front steering actuator 14 has the highest priority, the rear steering actuator 22 has the second-highest priority, the DYC actuator 32 has the third-highest priority, the front steering availability yaw rate $\gamma\_{FSTR\_Ava}$ is 6, the rear steering availability yaw rate $\gamma\_{RSTR\_Ava}$ is 3, and the DYC availability yaw rate $\gamma\_{DYC\_Ava}$ is 3; in this case, the feed-forward yaw rate control amount $\gamma\_{FF}$ is distributed so that the front steering feed-forward yaw rate control amount $\gamma\_{FSTR\_FF}$ is 6, the rear steering feed-forward yaw rate control amount $\gamma\_{RSTR\_FF}$ is 3, and the DYC feed-forward yaw rate control amount $\gamma\_{DYC\_FF}$ is 1. The respective distributed feed-forward yaw rate control amounts are then outputted to the feedback calculation unit 415 and the resolution unit 416.

The feedback calculation unit 415 takes as its inputs the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$) from the availability amount calculation unit 413, the respective feed-forward yaw rate control amounts (the front steering feed-forward yaw rate control amount $\gamma\_{FSTR\_FF}$, the rear steering feed-forward yaw rate control amount $\gamma\_{RSTR\_FF}$, and the DYC feed-forward yaw rate control amount $\gamma\_{DYC\_FF}$) from the feed-forward calculation unit 414, the feed-forward yaw rate reference amount $\gamma\_{ref}$, and a yaw rate $\gamma$ from a yaw rate sensor attached to the vehicle. Meanwhile, the feedback calculation unit 415 includes a control target selection unit 415a and a feedback control amount calculation unit 415b.

The control target selection unit 415a selects an actuator that can be used in the vehicle yaw rate control based on an allowance amount calculated from the respective availability yaw rates and the respective feed-forward yaw rate control amounts. The control target selection unit 415a also determines a priority order for the usable actuators.

The feedback control amount calculation unit 415b controls the vehicle yaw rate through feedback based on the deviation $\Delta\gamma(=\gamma\_{ref}-\gamma)$ between the inputted feed-forward yaw rate reference amount $\gamma\_{ref}$ and yaw rate $\gamma$. For example, in the case where the feedback control is PID control, a feedback yaw rate control amount $\gamma\_{FB}$ is calculated through the following Equation (1).

$$\gamma\_{FB} = K_p \cdot \Delta\gamma + K_i \cdot \int \Delta\gamma dt + K_d \cdot \frac{d\Delta\gamma}{dt} \quad (1)$$

In the above Equation (1), $K_p$ indicates a proportional gain, $K_i$ indicates an integrated gain, and $K_d$ indicates a derivative gain.

Furthermore, the feedback control amount calculation unit 415b distributes the calculated feedback yaw rate control amount $\gamma\_{FB}$ as a front steering feedback yaw rate control amount $\gamma\_{FSTR\_FB}$, a rear steering feedback yaw rate control amount $\gamma\_{RSTR\_FB}$, and a DYC feedback yaw rate control amount $\gamma\_{DYC\_FB}$. The front steering feedback yaw rate control amount $\gamma\_{FSTR\_FB}$ is a feedback control amount for a yaw rate caused to occur in the vehicle by actuating the front steering actuator 14. The rear steering feedback yaw rate control amount $\gamma\_{RSTR\_FB}$ is a feedback control amount for a yaw rate caused to occur in the vehicle by actuating the rear steering actuator 22. The DYC feedback yaw rate control amount $\gamma\_{DYC\_FB}$ is a feedback control amount for a yaw rate caused to occur in the vehicle by actuating the DYC actuator 32.

In this case, the feedback control amount calculation unit 415b distributes the feedback yaw rate control amount $\gamma\_{FB}$ in accordance with the priority order for usable actuators determined by the control target selection unit 415a. The feedback control amount calculation unit 415b then outputs the distributed feedback yaw rate control amounts (the front steering feedback yaw rate control amount $\gamma\_{FSTR\_FB}$, the rear steering feedback yaw rate control amount $\gamma\_{RSTR\_FB}$, and the DYC feedback yaw rate control amount $\gamma\_{DYC\_FB}$) to the resolution unit 416.

The resolution unit 416 includes a final value calculation unit 4161 and a control permission determination unit 4162. The final value calculation unit 4161 calculates the front steering yaw rate control amount $\gamma\_{FSTR}$ by adding the front steering feed-forward yaw rate control amount $\gamma\_{FSTR\_FF}$ inputted from the feed-forward calculation unit 414 with the front steering feedback yaw rate control amount $\gamma\_{FSTR\_FB}$ inputted from the feedback calculation unit 415. The calculated front steering yaw rate control amount $\gamma\_{FSTR}$ and the front steering actuation request signal $S\_{FSTR}$ for requesting the front steering actuator 14 to operate are then outputted to the front-wheel steering angle conversion unit 42. The resolution unit 416 calculates the rear steering yaw rate control amount $\gamma\_{RSTR}$ by adding the rear steering feed-forward yaw rate control amount $\gamma\_{RSTR\_FF}$ inputted from the feed-forward calculation unit 414 with the rear steering feedback yaw rate control amount $\gamma\_{RSTR\_FB}$ inputted from the feedback calculation unit 415. The calculated rear steering yaw rate control amount $\gamma\_{RSTR}$ and the rear steering actuation request signal $S\_{RSTR}$ for requesting the rear steering actuator 22 to operate are then outputted to the rear-wheel steering conversion unit 43. Furthermore, the resolution unit 416 calculates the DYC yaw rate control amount $\gamma\_{DYC}$ by adding the DYC feed-forward yaw rate control amount $\gamma\_{DYC\_FF}$ inputted from the feed-forward calculation unit 414 with the DYC feedback yaw rate control amount $\gamma\_{DYC\_FB}$ inputted from the feedback calculation unit 415. The calculated DYC yaw rate control amount $\gamma\_{DYC}$ and the DYC actuation request signal $S\_{DYC}$ for requesting the DYC actuator 32 to operate are then outputted to the DYC axle torque conversion unit 44.

As shown in FIG. 2, the front-wheel steering angle conversion unit 42 takes the front steering yaw rate control amount $\gamma\_{FSTR}$ as its input. In addition, a front wheel target steering (turning) angle $\delta f^*$ necessary to elicit a yaw rate corresponding to the front steering yaw rate control amount $\gamma\_{FSTR}$ in the vehicle through operations of the front steering actuator 14 is calculated. A signal representing the calculated front wheel target steering angle $\delta f^*$ is then outputted to the front steering actuator 14. Due to this output signal, the operation of the front steering actuator 14 is controlled so that the front wheel steering (turning) angle $\delta f$ becomes the front wheel target steering angle $\delta f^*$, or in other words, so that a yaw rate corresponding to the front steering yaw rate control amount $\gamma\_{FSTR}$ is generated in the vehicle through actuation of the front steering actuator 14.

The rear-wheel steering conversion unit 43 takes the rear steering yaw rate control amount $\gamma\_{RSTR}$ as its input. In addition, a rear wheel target steering (turning) angle $\delta r^*$ necessary to elicit a yaw rate corresponding to the rear steering yaw rate control amount $\gamma\_{RSTR}$ in the vehicle through actuation of the rear steering actuator 22 is calculated. A signal representing the calculated rear wheel target steering angle $\delta r^*$ is then outputted to the rear steering actuator 22. Due to this output signal, the actuation of the rear steering actuator 22 is controlled so that the rear wheel steering (turning) angle δr becomes the rear wheel target steering angle δr*, or in other words, so that a yaw rate corresponding to the rear steering yaw rate control amount $\gamma\_{RSTR}$ is generated in the vehicle through actuation of the rear steering actuator 22.

The DYC axle torque conversion unit 44 takes the DYC yaw rate control amount $\gamma\_{DYC}$ as its input. In addition, a target DYC torque Tb* necessary to elicit a yaw rate corresponding to the DYC yaw rate control amount $\gamma\_{DYC}$ in the vehicle through operations of the DYC actuator 32 is calculated. A signal representing the calculated target DYC torque Tb* is then outputted to the DYC actuator 32 that applies the braking force to the wheel on turning inside among the wheels. Due to this output signal, the operation of the DYC actuator 32 is controlled so that an axle torque Tb acting on the wheel on turning inside becomes the target DYC torque Tb*, or in other words, so that a yaw rate corresponding to the DYC yaw rate control amount $\gamma\_{DYC}$ is generated in the vehicle through actuation of the DYC actuator 32.

As a result of the cooperative control of the plurality of actuators (the front steering actuator 14, the rear steering actuator 22, and the DYC actuator 32), the yaw rate (lateral motion amount) of the vehicle is controlled so that the target lateral acceleration Gy* inputted from the driving assistance application 50 is generated in the vehicle.

Meanwhile, as shown in FIG. 3, the yaw rate calculation unit 41 includes the override determination unit 417. The override determination unit 417 takes, as its input, a steering torque τs from a steering torque sensor attached to the vehicle. The inputted steering torque τs is then compared to a threshold value $\tau s_{th}$ for the steering torque τs, and it is then determined whether or not an override is occurring based on the results of the comparison.

Figure 4:
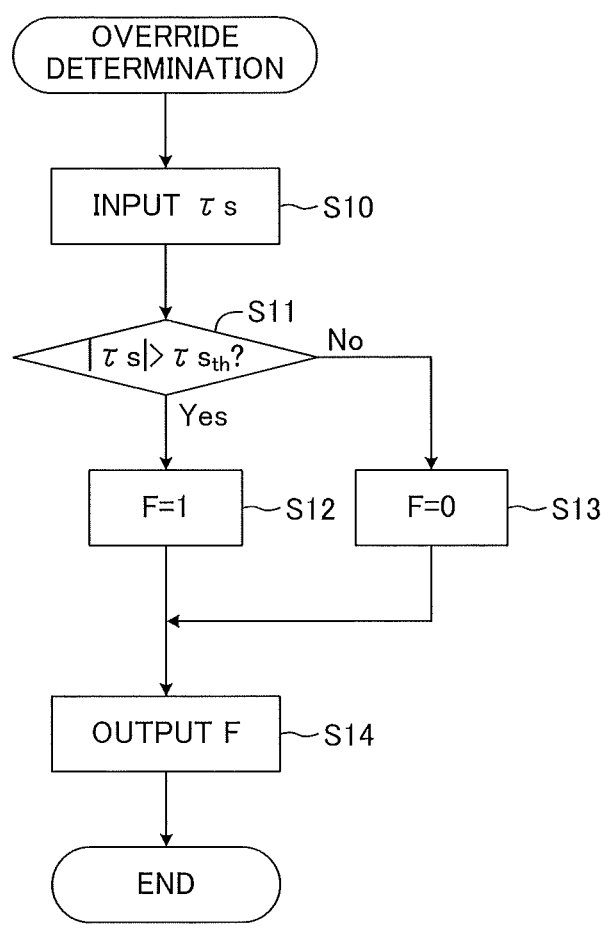
FIG. 4 is a flowchart illustrating an override determination routine executed by an override determination unit.

FIG. 4 is a flowchart illustrating an override determination routine executed by the override determination unit 417. This routine is launched when the lateral motion control apparatus 40 begins the lateral motion control of the vehicle, and is repeatedly executed every predetermined short amount of time. When the routine is launched, firstly in S (Step) 10 of FIG. 4, the override determination unit 417 takes the steering torque τs as its input. Next, it is determined whether or not an absolute value |τs| representing the magnitude of the steering torque is greater than the pre-set threshold value $\tau s_{th}$ (S11). In the case where the absolute value |τs| is greater than the threshold value $\tau s_{th}$ (S11: Yes), the override determination unit 417 advances to S12 and sets an override determination flag F to 1. However, in the case where the absolute value |τs| is less than or equal to the threshold value $\tau s_{th}$ (S11: No), the override determination unit 417 advances to S13 and sets the override determination flag F to 0. After the override determination flag F has been set to 0 or 1 in S12 or S13, the override determination flag F is outputted (S14). Thereafter, the routine ends.

Figure 5:
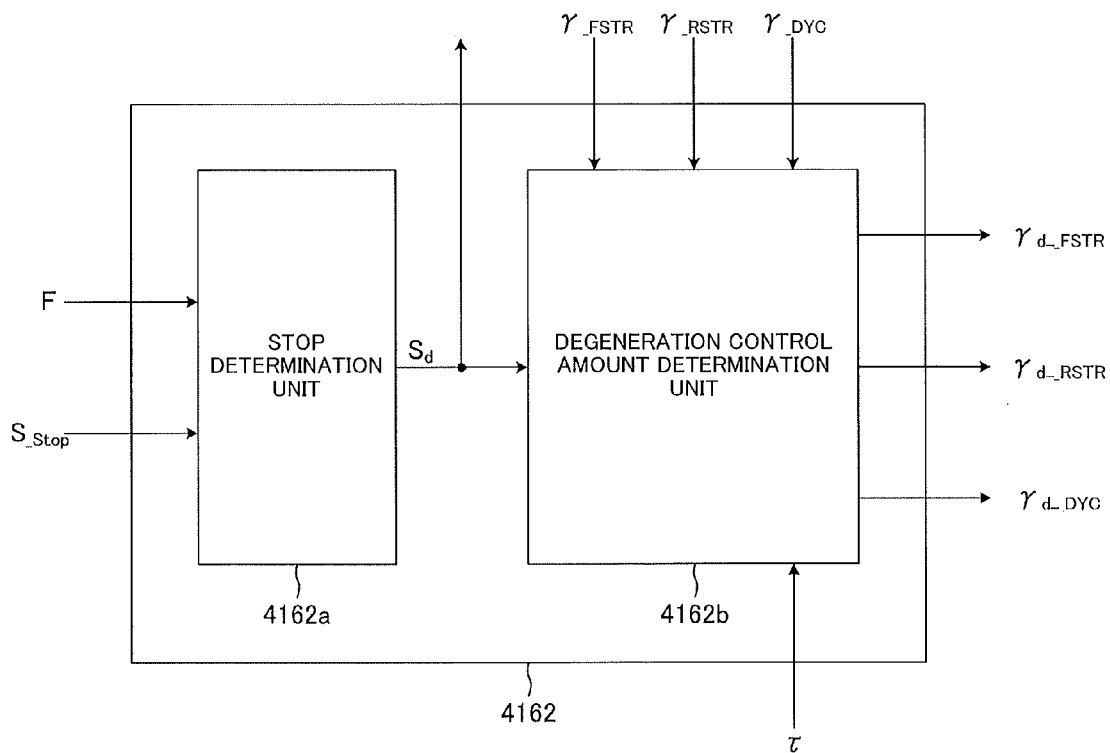
FIG. 5 is a diagram illustrating the functional configuration of a control permission determination unit.

As shown in FIG. 3, the override determination flag F set by the override determination unit 417 is inputted into the control permission determination unit 4162 of the resolution unit 416. FIG. 5 is a diagram illustrating the functional configuration of the control permission determination unit 4162. As shown in FIG. 5, the control permission determination unit 4162 includes a stop determination unit 4162a and a degeneration control amount determination unit 4162b.

Figure 6:
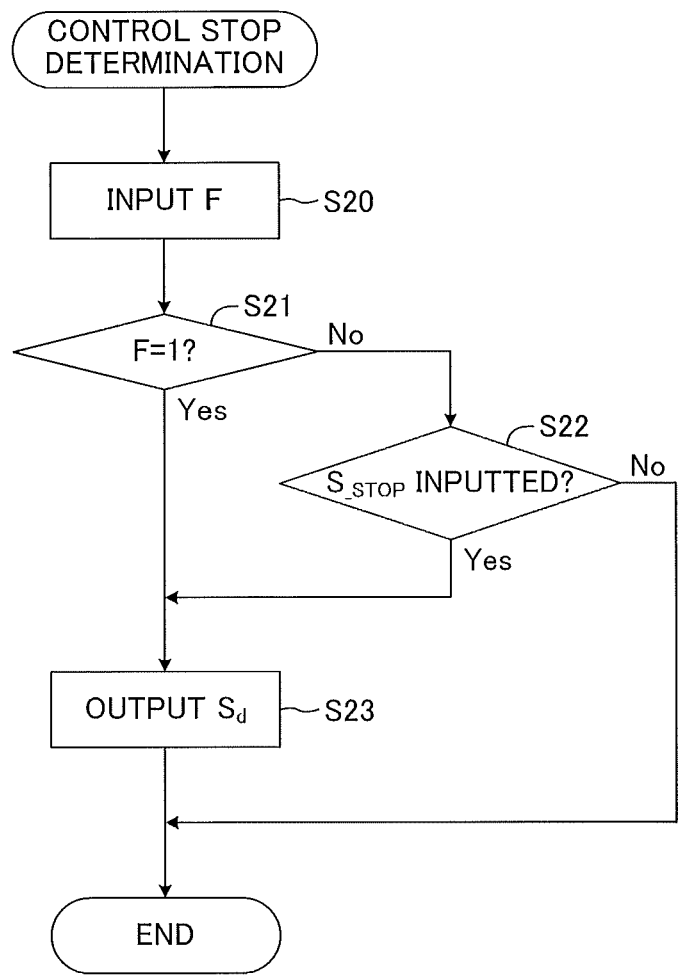
FIG. 6 is a flowchart illustrating a control stop determination routine executed by a stop determination unit.

The stop determination unit 4162a determines whether or not to stop the lateral motion control of the vehicle performed by the lateral motion control apparatus 40. The override determination flag F, a stop request signal $S\_{STOP}$ is inputted into the stop determination unit 4162a. FIG. 6 is a flowchart illustrating a control stop determination routine executed by the stop determination unit 4162a in order to determine whether or not to stop lateral motion control. This routine is launched when the lateral motion control apparatus 40 begins the lateral motion control of the vehicle.

When the routine is launched, firstly in S20 of FIG. 6, the stop determination unit 4162a takes the override determination flag F as its input. Next, it is determined whether or not the inputted override determination flag F is set to 1 (S21). In the case where the override determination flag F is set to 1, or in other words, in the case where an override is occurring (S21: Yes), the stop determination unit 4162a determines that the control of the respective actuators is to be stopped, advances to S23, and outputs a degeneration request signal $S_d$. Thereafter, the routine ends.

Meanwhile, in the case where the override determination flag F is not set to 1, or in other words, in the case where an override is not occurring (S21: No), the stop determination unit 4162a advances to S22, where it is determined whether or not the stop request signal $S\_{STOP}$ is being inputted. The stop request signal $S\_{STOP}$ is a signal for stopping the lateral motion control regardless of whether or not an override is occurring. The stop request signal $S\_{STOP}$ may be inputted by the driver of the vehicle. Alternatively, the stop request signal $S\_{STOP}$ may be inputted from the driving assistance application 50. In the case where the stop request signal $S\_{STOP}$ is being inputted (S22: Yes), the stop determination unit 4162a determines that the control of the respective actuators is to be stopped, advances to S24, and outputs the degeneration request signal $S_d$. Thereafter, the routine ends.

In the case where the stop request signal $S\_{STOP}$ is not being inputted (S22: No), the stop determination unit 4162a determines that the control of the respective actuators is not to be stopped, and the routine ends. Note that the stop determination unit 4162a repeatedly executes this routine when the degeneration request signal $S_d$ is not being outputted.

As can be seen from the foregoing descriptions, the stop determination unit 4162a determines that the control of the respective actuators is to be stopped in the case where the override determination flag F is set to 1 and the case where the stop request signal $S\_{STOP}$ is being inputted. The degeneration request signal $S_d$ is then outputted. The degeneration request signal $S_d$ outputted from the stop determination unit 4162a is inputted into the final value calculation unit 4161 and the degeneration control amount determination unit 4162b. In the case where the degeneration request signal $S_d$ has been inputted, the final value calculation unit 4161 stops the output of the respective yaw rate control amounts and the respective actuation request signals to the respective conversion units 42, 43, and 44.

The degeneration control amount determination unit 4162b takes the degeneration request signal $S_d$ from the stop determination unit 4162a as its input, as described above. Furthermore, the respective yaw rate control amounts ($\gamma\_{FSTR}$, $\gamma\_{RSTR}$, and $\gamma\_{DYC}$) from the final value calculation unit 4161 and the steering torque τs from the torque sensor attached to the vehicle are taken as inputs as well. After the degeneration request signal $S_d$ has been inputted, a front steering yaw rate degeneration control amount $\gamma_{d\_FSTR}$, a rear steering yaw rate degeneration control amount $\gamma_{d\_RSTR}$, and a DYC yaw rate degeneration control amount $\gamma_{d\_DYC}$ are calculated. Furthermore, the calculated front steering yaw rate degeneration control amount $\gamma_{d\_FSTR}$ is outputted to the front-wheel steering angle conversion unit 42, the calculated rear steering yaw rate degeneration control amount $\gamma_{d\_RSTR}$ is outputted to the rear-wheel steering conversion unit 43, and the calculated DYC yaw rate degeneration control amount $\gamma_{d\_DYC}$ is outputted to the DYC axle torque conversion unit 44.

In this case, the front-wheel steering angle conversion unit 42 calculates the front wheel target steering angle δf* based on the inputted front steering yaw rate degeneration control amount $\gamma_{d\_FSTR}$. The calculated front wheel target steering angle δf* is then outputted to the front steering actuator 14. The front steering actuator 14 operates so that the front wheel steering angle δf matches the front wheel target steering angle δf*. The rear-wheel steering conversion unit 43 calculates a rear wheel target steering angle δr* based on the inputted rear steering yaw rate degeneration control amount $\gamma_{d\_RSTR}$. The calculated rear wheel target steering angle δr* is then outputted to the rear steering actuator 22. The rear steering actuator 22 operates so that the rear wheel steering angle δr matches the rear wheel target steering angle δr*. The DYC axle torque conversion unit 44 calculates the target DYC torque Tb* based on the inputted DYC yaw rate degeneration control amount $\gamma_{d\_DYC}$. The calculated target DYC torque Tb* is outputted to the DYC actuator 32 that is to be operated. The DYC actuator 32 into which the target DYC torque Tb* has been inputted then operates so that the axle torque Tb acting on the corresponding wheel matches the target DYC torque Tb*. In this manner, after the degeneration request signal $S_d$ has been outputted by the stop determination unit 4162a, the respective conversion units 42, 43, and 44 control the operations of the respective actuators based on the respective yaw rate degeneration control amounts $\gamma_{d\_*}$ (where * indicates FSTR, RSTR, or DYC) determined (calculated) by the degeneration control amount determination unit 4162b. Through this, degeneration control is carried out on the respective actuators.

Figure 7:
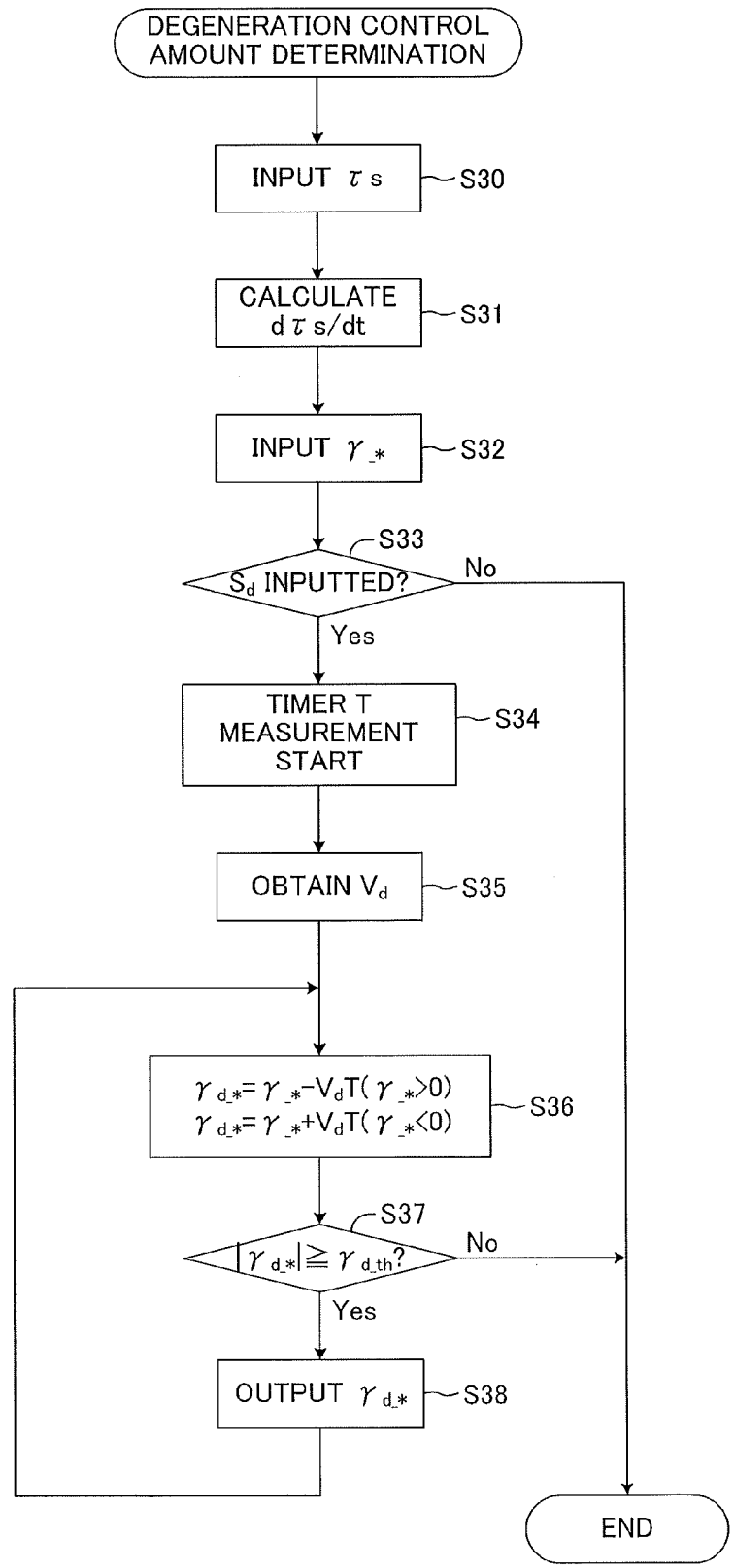
FIG. 7 is a flowchart illustrating a degeneration control amount determination routine executed by a degeneration control amount determination unit according to a first embodiment in order to calculate a degeneration control amount.

FIG. 7 is a flowchart illustrating a degeneration control amount determination routine executed by the degeneration control amount determination unit 4162b in order to calculate the yaw rate degeneration control amounts $\gamma_{d\_*}$. This routine launches when the lateral motion control is started by the lateral motion control apparatus 40. When the routine launches, in S30 of FIG. 7, the degeneration control amount determination unit 4162b takes the steering torque τs as its input. Next, the steering torque τs differentiated with respect to time to calculate the rate of change dτs/dt of the steering torque τs (Step S31). Subsequently, each yaw rate control amount $\gamma_{\_*}$ (* represents any of FSTR, RSTR, and DYC) is inputted (Step S32). Next, it is determined whether or not the degeneration request signal $S_d$ is being inputted (S33). The routine ends in the case where the degeneration request signal $S_d$ is not being inputted (S33: No). Note that in the case where the degeneration request signal $S_d$ is not being inputted, the present routine is repeatedly executed until the degeneration request signal $S_d$ is inputted.

Meanwhile, in the case where the degeneration request signal $S_d$ is inputted (Step S33: Yes), the degeneration control amount determination unit 4162b advances the routine to Step S34, where a timer T commences measurement. Next, a degeneration rate $V_d$ is obtained (Step S35). The degeneration rate $V_d$ (yaw rate/second) represents the rate of reduction in the control amount (yaw rate) during degeneration control. A "degeneration rate-steering torque rate-of-change" table is referenced to obtain the degeneration rate $V_d$. This "degeneration rate-steering torque rate-of-change" table is stored in the degeneration control amount determination unit 4162b.

Figure 8:
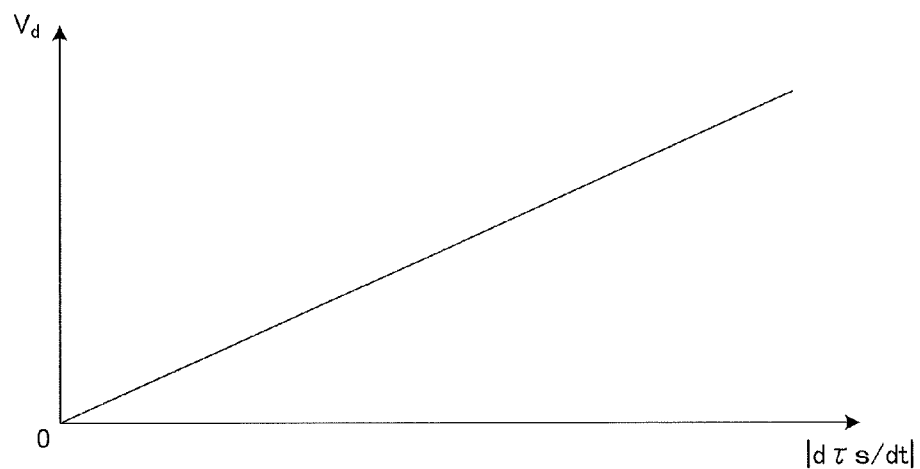
FIG. 8 is a graph illustrating an example of the "degeneration rate-steering torque rate of change" table.

FIG. 8 is a graph illustrating an example of the "degeneration rate-steering torque rate-of-change" table. In the graph shown in FIG. 8, the horizontal axis represents the magnitude of the rate of change dτs/dt of the steering torque τs, whereas the vertical axis represents the magnitude of the degeneration rate $V_d$. As will be noted from the figure, the greater the rate of change dτs/dt of the steering torque τs becomes, the greater the degeneration rate $V_d$ becomes correspondingly to the rate of change dτs/dt. The degeneration control amount determination unit 4162b references the "degeneration rate-steering torque rate-of-change" table to extract and obtain a degeneration rate $V_d$ corresponding to the calculated rate of change dτs/dt of the steering torque τs. As mentioned above, the degeneration rate $V_d$ is set such that the degeneration rate $V_d$ changes in accordance with the rate of change dτs/dt of the steering torque τs representing the steering operation amount inputted by the driver. Note that this degeneration rate $V_d$ may be obtained for each actuator.

After the degeneration rate $V_d$ is obtained, the degeneration control amount determination unit 4162b advances the routine to Step S36 shown in FIG. 7 to calculate each yaw rate degeneration control amount $\gamma_{d\_*}$ based on the following equations:

$$\gamma_{d\_*} = \gamma_{\_*} - V_d T \quad (\gamma_{\_*} > 0),$$

$$\gamma_{d\_*} = \gamma_{\_*} + V_d T \quad (\gamma_{\_*} < 0),$$

where T represents time measured by the timer.

Next, the degeneration control amount determination unit 4162b determines whether or not the magnitude of each calculated yaw rate degeneration control amount $\gamma_{d\_*}$ is equal to or greater than a minute value $\gamma_{d\_th}$ near zero (Step S37). When the magnitude of each yaw rate degeneration control amount $\gamma_{d\_*}$ is equal to or greater than the minute value $\gamma_{d\_th}$ near zero (Step S37: Yes), the degeneration control amount determination unit 4162b advances the routine to Step S38 to output the yaw rate degeneration control amount $\gamma_{d\_*}$ calculated in Step S36, and then returns the routine to Step S36 to calculate each yaw rate degeneration control amount $\gamma_{d\_*}$ again (Step S36) and thereafter determine whether or not the magnitude of each calculated yaw rate degeneration control amount $\gamma_{d\_*}$ is equal to or greater than the minute value $\gamma_{d\_th}$ near zero (Step S37) and, when equal to or greater than the minute value $\gamma_{d\_th}$, outputs the yaw rate degeneration control amount $\gamma_{d\_*}$. Repeating Steps S36 to S38 continues to output the yaw rate degeneration control amount $\gamma_{d\_*}$ calculated in Step S36 until the magnitude of each yaw rate degeneration control amount $\gamma_{d\_*}$ becomes smaller than the minute value $\gamma_{d\_th}$ near zero.

When it is determined in Step S37 that the magnitude of each yaw rate degeneration control amount $\gamma_{d\_*}$ is smaller than the minute value $\gamma_{d\_th}$ near zero (Step S37: No), the degeneration control amount determination unit 4162b terminates this routine. By executing the degeneration control amount determination routine in this manner, it is possible to control each actuator during degeneration control based on each yaw rate degeneration control amount $\gamma_{d\_*}$, the magnitude of which gradually decreases. Then, the lateral motion control by the lateral motion control apparatus is stopped when the magnitude of the yaw rate degeneration control amount $\gamma_{d\_*}$ of each actuator becomes zero. By gradually reducing the control amount for each actuator through degeneration control, it is possible to prevent immediate stop of the control for each actuator and thereby a sense of discomfort. Accordingly, the lateral motion control can be stopped while the behavior of a vehicle is stabilized.

Figure 9:
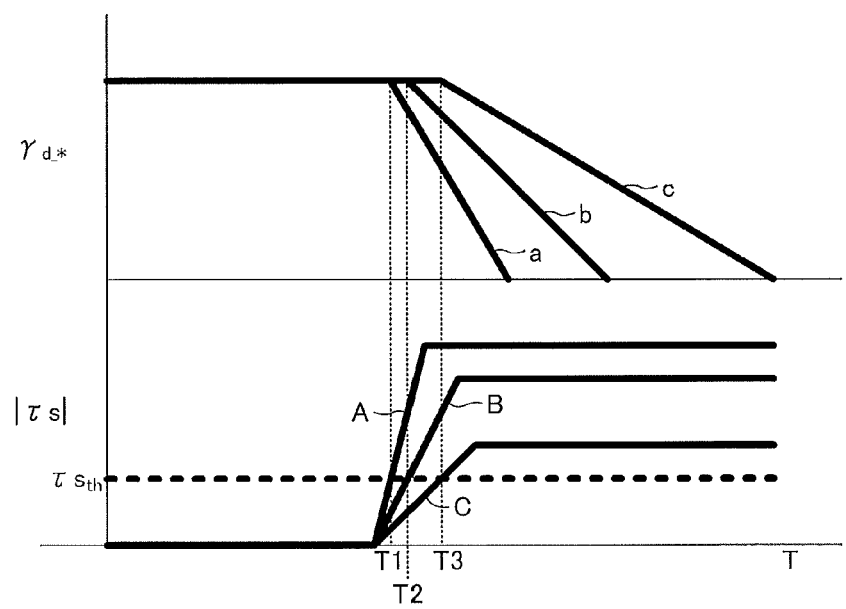
FIG. 9 is a graph illustrating the change in a yaw rate degeneration control amount along with the change in the magnitude of a steering torque τs during degeneration control.

FIG. 9 is a graph illustrating the change in the yaw rate degeneration control amount $\gamma_{d\_*}$ along with the change in the magnitude of the steering torque τs during degeneration control. In the figure, the magnitude of the steering torque τs changes as indicated by the lines A, B, and C. When the magnitude of the steering torque τs changes as indicated by the line A, the yaw rate degeneration control amount $\gamma_{d\_*}$ changes as indicated by the line "a". When the magnitude of the steering torque τs changes as indicated by the line B, the yaw rate degeneration control amount $\gamma_{d\_*}$ changes as indicated by the line "b". When the magnitude of the steering torque τs changes as indicated by the line C, the yaw rate degeneration control amount $\gamma_{d\_*}$ changes as indicated by the line "c".

When the magnitude of the steering torque τs changes as indicated by the line A, the magnitude of the steering torque τs exceeds the threshold value $τs_{th}$ at the time T1. Therefore, the degeneration control is started at the time T1. In the case that the rate of change dτs/dt of the steering torque τs large as indicated by the line A, the degeneration rate of the yaw rate degeneration control amount $\gamma_{d\_*}$ is also large as indicated by the line "a".

The magnitude of the steering torque τs, when changes as indicated by the line C, exceeds the threshold value $τs_{th}$ at the time T3, which is later than the time T1. Therefore, the degeneration control is started at the time T3. In the case that the rate of change dτs/dt of the steering torque τs is low as indicated by the line C, the degeneration rate of the yaw rate degeneration control amount $\gamma_{d\_*}$ is also low as indicated by the line "c".

The magnitude of the steering torque τs, when changes as indicated by the line B, exceeds the threshold value $τs_{th}$ at the time T2, which is later than the time T1 but earlier than the time T3. Therefore, the degeneration control is started at the time T2. In the case that the rate of change dτs/dt of the steering torque τs exists, as indicated by the line B, between the rate of change indicated by the line A and the rate of change indicated by the line C, the degeneration rate of the yaw rate degeneration control amount $\gamma_{d\_*}$ exists between the degeneration rate indicated by the line "a" and the degeneration rate indicated by the line "c". Thus, according to this embodiment, the degeneration rate $V_d$ is set such that the greater the rate of change dτs/dt of the steering torque τs becomes, the greater the degeneration rate $V_d$ becomes.

If the rate of change dτs/dt of the steering torque τs is large at the start of the degeneration control, it is highly possible that the driver performs a steering operation based on his/her own intent. In this case, reducing obstruction to the steering operation by the driver due to degeneration control should take priority over reducing through degeneration control a sense of discomfort at the time of stopping the vehicle lateral motion control. Meanwhile, if the rate of change dτs/dt of the steering torque τs low at the start of the degeneration control, it is unclear whether or not the driver performs a steering operation based on his/her own intent. In this case, reducing through degeneration control a sense of discomfort at the time of stopping the vehicle lateral motion control should take priority over reducing obstruction to the steering operation by the driver due to degeneration control.

According to this embodiment described heretofore, the degeneration rate $V_d$ is set such that the greater the rate of change dτs/dt of the steering torque τs at the start of the degeneration control becomes, the greater the degeneration rate $V_d$ becomes, and the yaw rate degeneration control amount $\gamma_{d\_*}$ is determined based on the thus set degeneration rate $V_d$. Accordingly, when the rate of change dτs/dt of the steering torque τs during the degeneration control is high, the degeneration rate $V_d$ is set to high and thereby the degeneration control terminates in a short period of time. This can reduce obstruction to the steering operation by the driver due to degeneration control. Meanwhile, when the rate of change dτs/dt of the steering torque τs during the degeneration control is low, the degeneration rate $V_d$ is set to low and thereby the degeneration control is relatively time-consuming. This can further reduce a sense of discomfort at the time of stopping the vehicle lateral motion control.

Second Embodiment

The first embodiment above describes the case where the greater the rate of change of the steering torque τs becomes, the greater the degeneration rate is set. In this embodiment will be described the case where the degeneration time $T_d$ is set based on the steering torque τs and traveling conditions of the vehicle. Note that the lateral motion control apparatus 40 according to this embodiment has the same configuration as that described in the first embodiment above, except for the degeneration control amount determination routine that will be described hereinafter and is executed by the degeneration control amount determination unit 4162b. Therefore, descriptions will be omitted for elements that are the same as in the first embodiment.

Figure 10:
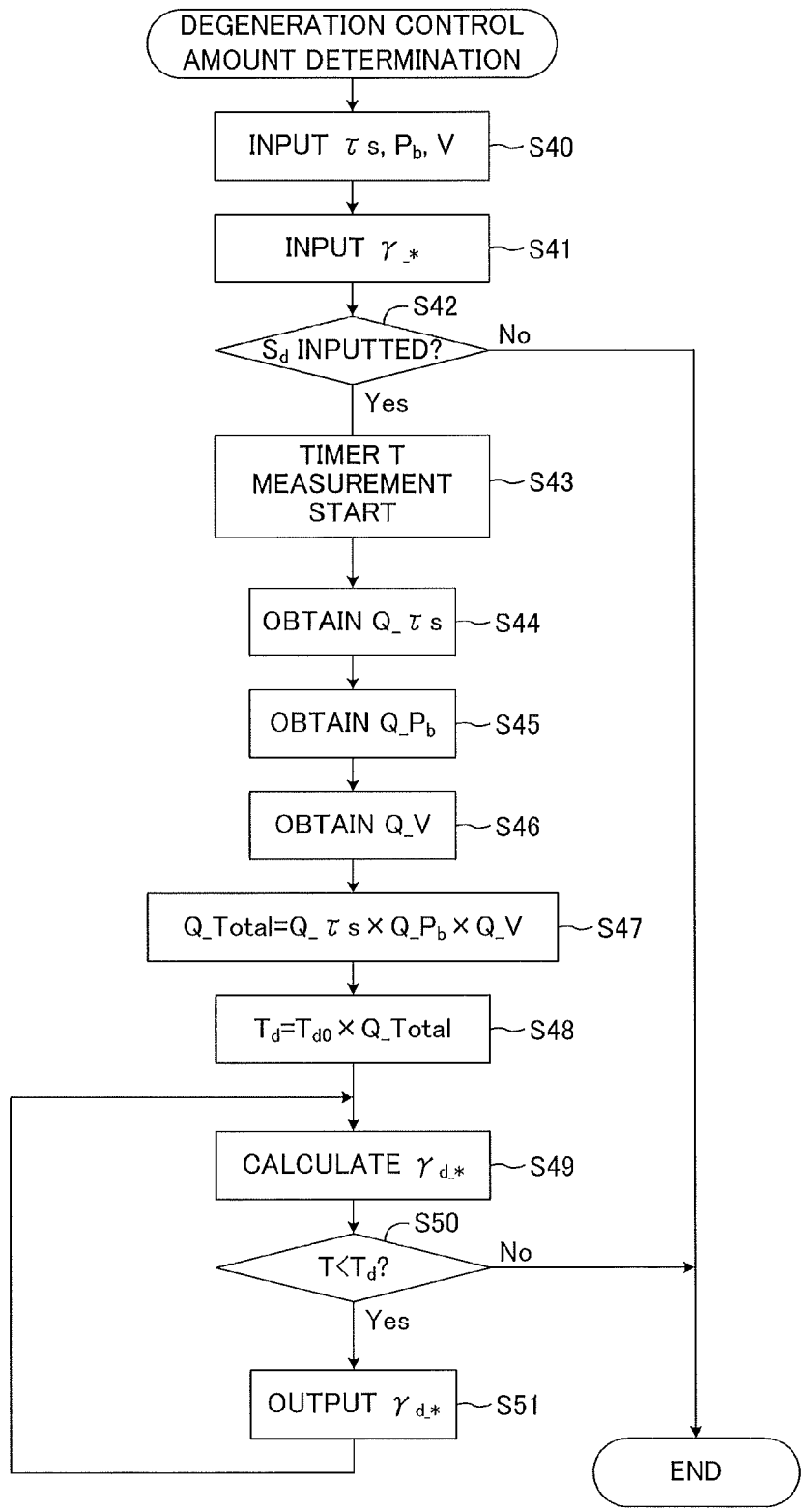
FIG. 10 is a flow chart illustrating a degeneration control amount determination routine executed by a degeneration control amount determination unit according to a second embodiment in order to calculate a degeneration control amount.

FIG. 10 is a flowchart illustrating a degeneration control amount determination routine executed by the degeneration control amount determination unit 4162b according to the present embodiment in order to calculate the yaw rate degeneration control amounts $\gamma_{d\_*}$. This routine is launched when the lateral motion control is started by the lateral motion control apparatus 40. When this routine is launched, in S40 of FIG. 10, the degeneration control amount determination unit 4162b inputs a steering torque τs (Nm), a braking pressure $P_b$ (MPa) acting on each wheel, and a vehicle speed V (Km/h). The braking pressure $P_b$ can be obtained by detecting with a pressure sensor the hydraulic pressure in a hydraulic circuit that is provided to apply a braking force to each wheel, for example.

Next, the degeneration control amount determination unit 4162b inputs each yaw rate control amount $\gamma_*$ (S41), and subsequently determines whether or not the degeneration request signal $S_d$ is inputted, that is, the control stop determination unit 4162a determines to stop the control for each actuator (S42). When no degeneration request signal $S_d$ is inputted (S42: No), this routine ends. Note that when no degeneration request signal $S_d$ is inputted, this routine is repeated until the signal is inputted.

Meanwhile, when the degeneration request signal $S_d$ is inputted (S42: Yes), that is, when the control stop determination unit 4162a determines to stop the control for each actuator, the degeneration control amount determination unit 4162b commences time measurement using a timer (S43). Next, a steering torque score Q_τs is obtained (S44). The steering torque score Q_τs is used to set the degeneration time $T_d$, during which each actuator undergoes degeneration control. A steering torque score table is referenced to obtain the steering torque score Q_τs.

Figure 11:
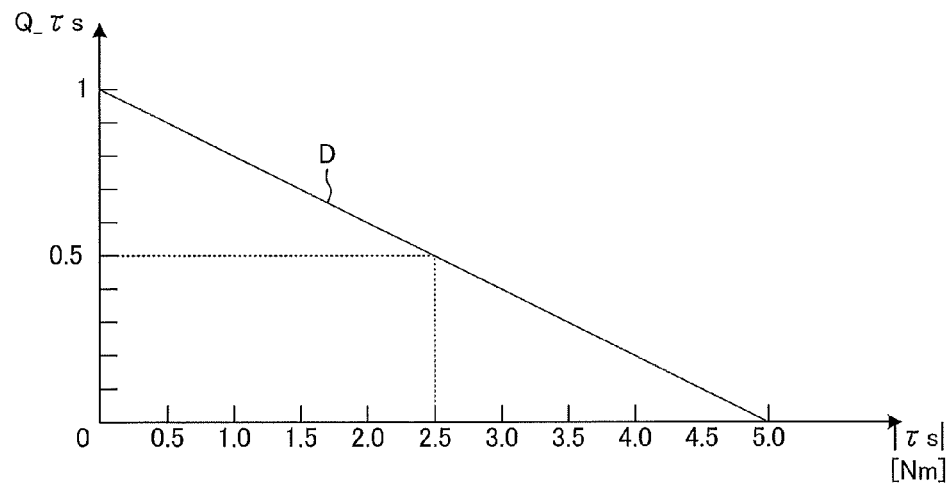
FIG. 11 is a graph illustrating a steering torque score table.

FIG. 11 is a graph illustrating a steering torque score table. The steering torque score table is stored in the degeneration control amount determination unit 4162b. In FIG. 11, the horizontal axis represents the magnitude of the steering torque τs, while the vertical axis represents the steering torque score Q_τs. The relationship between the steering torque τs (Nm) and the steering torque score Q_τs is indicated by the line D. As will be noted from the figure, when the magnitude of the steering torque τs is 0 (Nm), the steering torque score Q_τs is 1. As the magnitude of the steering torque τs increases from zero, the steering torque score Q_τs decreases correspondingly to the steering torque τs. When the magnitude of the steering torque τs is 5.0 (Nm), the steering torque score Q_τs is 0.

In the case that the steering torque τs low at the start of the degeneration control (at the time when the degeneration request signal $S_d$ is inputted to the degeneration control amount determination unit 4162b), since the steering operation amount by the driver himself/herself is small, the need for rapid switching from automatic steering by the lateral motion control apparatus 40 to manual steering by the driver is low. In other words, In the case that the steering torque τs is low at the start of the degeneration control, the temporal margin until the steering operation is left entirely to the driver after the start of the degeneration control is large. Meanwhile, in the case that the steering torque τs is high at the start of the degeneration control, there is a possibility of an emergency occurring during automatic steering for some reason and thus the steering operation needs to be left rapidly to the driver. In this case, the temporal margin until the steering operation is left entirely to the driver after the start of the degeneration control is small accordingly. The magnitude of such a temporal margin is herein referred to as margin-of-steering ratio. The margin-of-steering ratio that is estimated from the magnitude of the steering torque τs represented by the steering torque score $Q\_τs$. In this embodiment, the greater the steering torque score $Q\_τs$ becomes, the greater the margin-of-steering ratio becomes. In Step S44, the degeneration control amount determination unit 4162b references the steering torque score table shown in FIG. 11 to obtain a steering torque score $Q\_τs$ corresponding to the input steering torque τs.

Next, the degeneration control amount determination unit 4162b obtains a braking force score $Q\_P_b$ (S45). The braking force score $Q\_P_b$ is also used to set the degeneration time $T_d$. A braking force score table is referenced to obtain the braking force score $Q\_P_b$.

Figure 12:
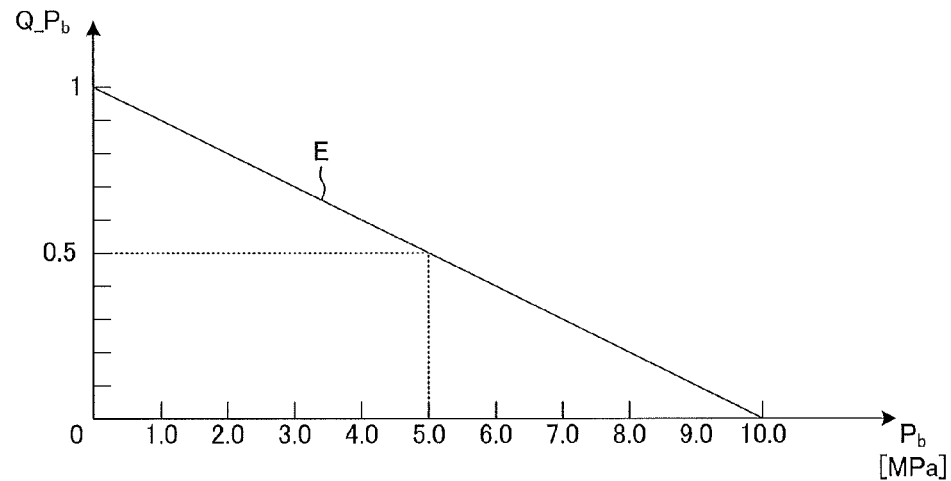
FIG. 12 is a graph illustrating a braking force score table.

FIG. 12 is a graph illustrating a braking force score table. The braking force score table is stored in the degeneration control amount determination unit 4162b. In FIG. 12, the horizontal axis represents the magnitude of the braking pressure (MPa), while the vertical axis represents the braking force score $Q\_P_b$. The relationship between the braking pressure $P_b$ (MPa) and the braking force score $Q\_P_b$ is indicated by the line E. As will be noted from the figure, when the magnitude of the braking pressure $P_b$ is 0 (MPa), the braking force score $Q\_P_b$ is 1. As the magnitude of the braking pressure $P_b$ increases from zero, the braking force score $Q\_P_b$ decreases correspondingly to the braking pressure $P_b$. When the magnitude of the braking pressure $P_b$ is 10.0 (MPa), the braking force score $Q\_P_b$ is 0.

In the case that the braking pressure $P_b$ is low at the start of the degeneration control, since the amount of braking by the driver himself/herself is small, the need for rapid switching from automatic steering by the lateral motion control apparatus 40 to manual steering by the driver is low. In other words, in the case that the braking pressure $P_b$ is low at the start of the degeneration control, the margin-of-steering ratio is high. Meanwhile, in the case that the braking pressure $P_b$ is high at the start of the degeneration control, there is a possibility of an emergency occurring during automatic steering for some reason and thus the steering operation needs to be left rapidly to the driver. In this case, the margin-of-steering ratio is low accordingly. The margin-of-steering ratio that is estimated from the magnitude of the braking pressure $P_b$ is represented by the braking force score $Q\_P_b$. In this embodiment, the greater the braking force score $Q\_P_b$ becomes, the greater the margin-of-steering ratio becomes. In Step S45, the degeneration control amount determination unit 4162b references the braking force score table shown in FIG. 12 to obtain a braking force score $Q\_P_b$ corresponding to the input braking pressure $P_b$.

Next, the degeneration control amount determination unit 4162b obtains a vehicle speed score $Q\_V$ (S46). The vehicle speed score $Q\_V$ is also used to set the degeneration time $T_d$. A vehicle speed score table is referenced to obtain the vehicle speed score $Q\_V$.

Figure 13:
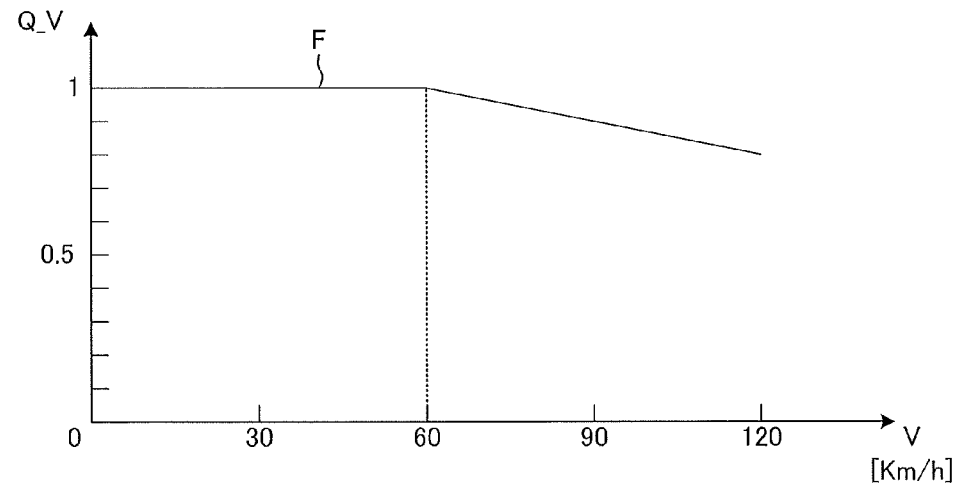
FIG. 13 is a graph illustrating a vehicle speed score table.

FIG. 13 is a graph illustrating a vehicle speed score table. The vehicle speed score table is stored in the degeneration control amount determination unit 4162b. In FIG. 13, the horizontal axis represents the vehicle speed (Km/h), while the vertical axis represents the vehicle speed score $Q\_V$. The relationship between the vehicle speed V and the vehicle speed score $Q\_V$ is indicated by the line F. As will be noted from the figure, when the vehicle speed V is within the range from 0 to 60 (Km/h), the vehicle speed score $Q\_V$ is 1. When the vehicle speed V is greater than 60 (Km/h), as the vehicle speed V increases, the vehicle speed score $Q\_V$ decreases correspondingly to the vehicle speed V. When the vehicle speed V is 120, the vehicle speed score $Q\_V$ is 0.8.

In the case that the vehicle speed V is low at the start of the degeneration control (60 Km/h or lower in this example), since the amount of driving by the driver himself/herself is small, the need for rapid switching from automatic steering by the lateral motion control apparatus 40 to manual steering by the driver is low. In other words, in the case that the vehicle speed V is low at the start of the degeneration control, the margin-of-steering ratio is high. Meanwhile, in the case that the vehicle speed V is high at the start of the degeneration control (60 Km/h or greater in this example), the steering operation needs to be left rapidly to the driver. In this case, the margin-of-steering ratio is low accordingly. The margin-of-steering ratio that is estimated from the magnitude of the vehicle speed V is represented by the vehicle speed score $Q\_V$. In this embodiment, the greater the vehicle speed score $Q\_V$ becomes, the greater the margin-of-steering ratio becomes. In S46, the degeneration control amount determination unit 4162b references the vehicle speed score table shown in FIG. 13 to obtain a vehicle speed score $Q\_V$ corresponding to the input vehicle speed V.

Next, the degeneration control amount determination unit 4162b calculates a total score $Q\_Total$ by multiplying the steering torque score $Q\_τs$ obtained in S44 by the braking force score $Q\_P_b$ obtained in S45 and the vehicle speed score $Q\_V$ obtained in S46 (Step S47). The total score $Q\_Total$ is a margin-of-steering ratio calculated in view of the steering torque τs, braking pressure $P_b$, and vehicle speed V. The steering torque τs represents the steering operation amount by the driver. The braking pressure $P_b$ and the vehicle speed V represent the traveling conditions of the vehicle. The total score $Q\_Total$ therefore represents a margin-of-steering ratio in view of the steering operation amount and the traveling conditions of the vehicle. The total score $Q\_Total$ has a maximum value of 1 and a minimum value of 0. The greater the total score $Q\_Total$ becomes, the greater the margin-of-steering ratio becomes.

Next, the degeneration control amount determination unit 4162b calculates a degeneration time $T_d$ by multiplying the total score $Q\_Total$ by a predefined reference degeneration time $T_{d0}$ (S48). It is preferable for the reference degeneration time $T_{d0}$ to be a time favorable to stop the lateral motion control without imposing a sense of discomfort on the driver when the vehicle travels straight at low speed (60 Km/h or lower), for example. The reference degeneration time $T_{d0}$ may be set to 1 second, for example.

After calculating the degeneration time $T_d$ in S48, the degeneration control amount determination unit 4162b calculates each yaw rate degeneration control amount $γ_{d\_*}$ based on the time T measured by the timer (S49). In this case, the degeneration control amount determination unit 4162b calculates each yaw rate degeneration control amount $\gamma_{d\_*}$ such that each yaw rate degeneration control amount $\gamma_{d\_*}$ decreases gradually after the timer starts measuring time in S43, and that the yaw rate degeneration control amount $\gamma_{d\_*}$ becomes zero at the time when the measured time reaches the degeneration time $T_d$. For example, each yaw rate degeneration control amount $\gamma_{d\_*}$ may be calculated based on the following equation:

$$\gamma_{d\_*} = \gamma_{\_*}(1-(T/T_d)),$$

where $\gamma_{\_*}$ represents the amount of yaw rate control input in Step S41 when the degeneration request signal $S_d$ is inputted, and T represents time measured by the timer.

Figure 14:
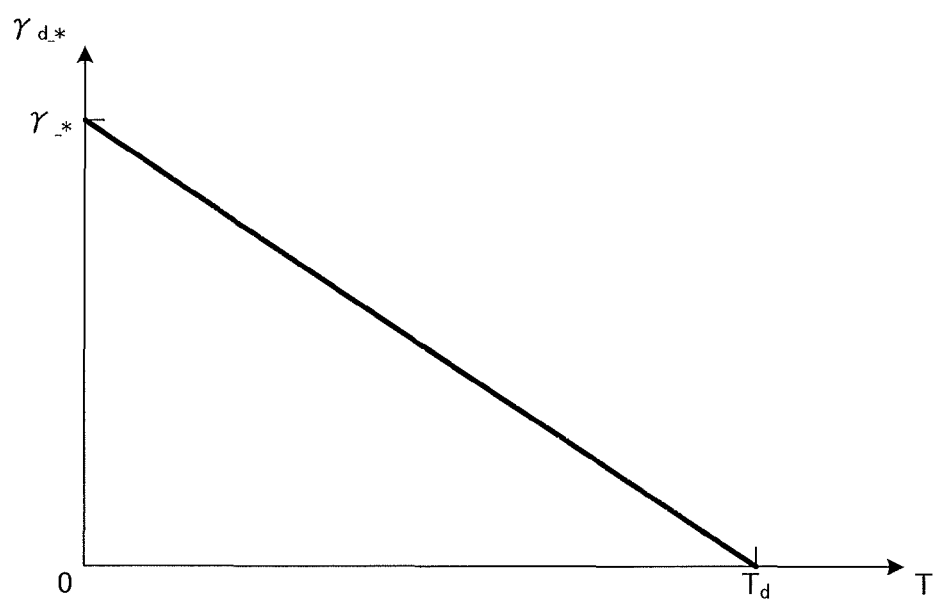
FIG. 14 is a graph illustrating the relationship between the yaw rate degeneration control amount $\gamma_{d\_*}$ and the time T measured by a timer.

According to the equation above, when T=0, the yaw rate degeneration control amount $\gamma_{d\_*}$ is equal to the yaw rate control amount $\gamma_{\_*}$. When T=$T_d$, the yaw rate degeneration control amount $\gamma_{d\_*}$ is zero. When $0<T<T_d$, the yaw rate degeneration control amount $\gamma_{d\_*}$ decreases linearly as T increases. FIG. 14 is a graph illustrating the relationship between the yaw rate degeneration control amount $\gamma_{d\_*}$ and the time T measured by the timer, as expressed in the equation above.

After calculation of the yaw rate degeneration control amount $\gamma_{d\_*}$ in S49, the degeneration control amount determination unit 4162b advances the routine to S50 and determines whether or not the time T measured by the timer is shorter than the degeneration time $T_d$. When the measured time T is shorter than the degeneration time $T_d$ (S50: Yes), the degeneration control amount determination unit 4162b outputs the yaw rate degeneration control amount $\gamma_{d\_*}$ calculated in S49, and then returns the routine to S49 to calculate the yaw rate degeneration control amount $\gamma_{d\_*}$ again and, when the determination result is Yes in S50, outputs the yaw rate degeneration control amount $\gamma_{d\_*}$ (S51). Repeating S49 to S51 continues to output the yaw rate degeneration control amount $\gamma_{d\_*}$ calculated in S49 until the measured time T reaches the degeneration time $T_d$.

In the case it is determined in Step S50 that the time T measured by the timer is not shorter than the degeneration time $T_d$ (S50: No), that is, in the case that the measured time T reaches the degeneration time $T_d$, the degeneration control amount determination unit 4162b terminates this routine. By executing the degeneration control amount determination routine, the degeneration time $T_d$ is set in accordance with the steering operation amount by the driver and the vehicle conditions (input state of steering torque τs, state of braking operation, vehicle speed, etc.), and each actuator undergoes degeneration control based on each yaw rate degeneration control amount $\gamma_{d\_*}$ that is determined based on the set degeneration time. Then, the lateral motion control by the lateral motion control apparatus is stopped when the magnitude of the yaw rate degeneration control amount $\gamma_{d\_*}$ of each actuator becomes zero. By gradually reducing the control amount for each actuator through degeneration control in this manner, it is possible to prevent immediate stop of the control for each actuator and thereby a sense of discomfort. Accordingly, the lateral motion control can be stopped with a stabilized vehicle behavior.

FIGS. 15 to 19 are diagrams illustrating the state of the change in the yaw rate degeneration control amount $\gamma_{d\_*}$ when the degeneration control according to this embodiment is executed.

Figure 15:
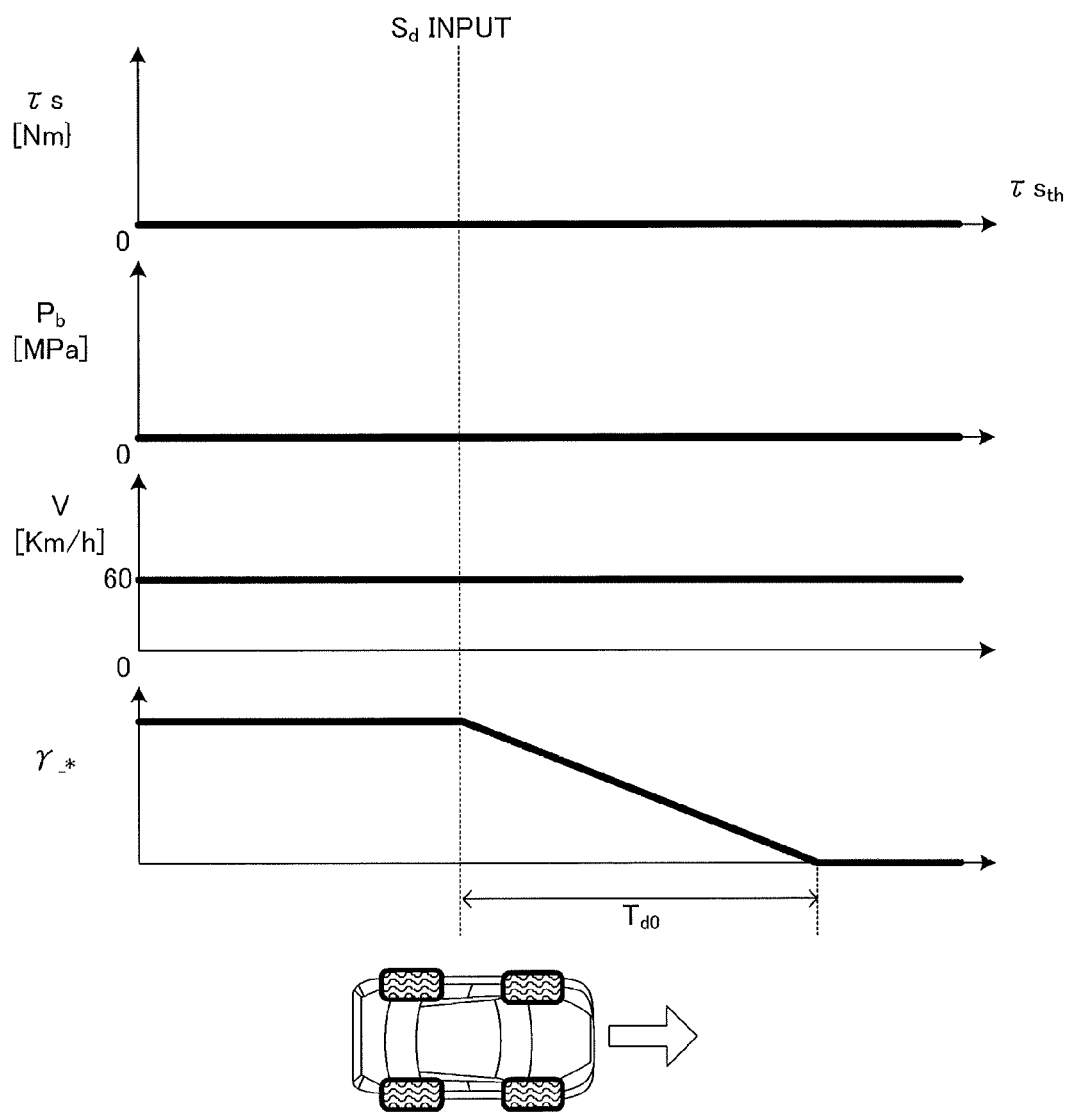
FIG. 15 is a diagram illustrating an example of the change in the yaw rate degeneration control amount in the degeneration control according to the second embodiment.

Referring to FIG. 15, when the degeneration request signal $S_d$ is inputted (the degeneration control is started), the steering torque τs 0 (Nm), the braking pressure $P_b$ is 0 (MPa), and the vehicle velocity V is 60 Km/h. In this case, the steering torque score Q_τs is 1, the braking force score Q_$P_b$ is also 1, and the vehicle velocity score Q_V is also 1. Therefore, the total score Q_Total is 1, that is, the degeneration time $T_d$ is equal to the reference degeneration time $T_{d0}$. In this manner, when the vehicle traveling conditions are stable (the vehicle travels straight at low velocity with no braking force acting thereon), the margin-of-steering ratio at the start of the degeneration control is high and thus the degeneration time $T_d$ is set to the longest. Note that in this case, the degeneration request signal $S_d$ is inputted from, for example, the driving assistance application 50 or the driver.

Figure 16:
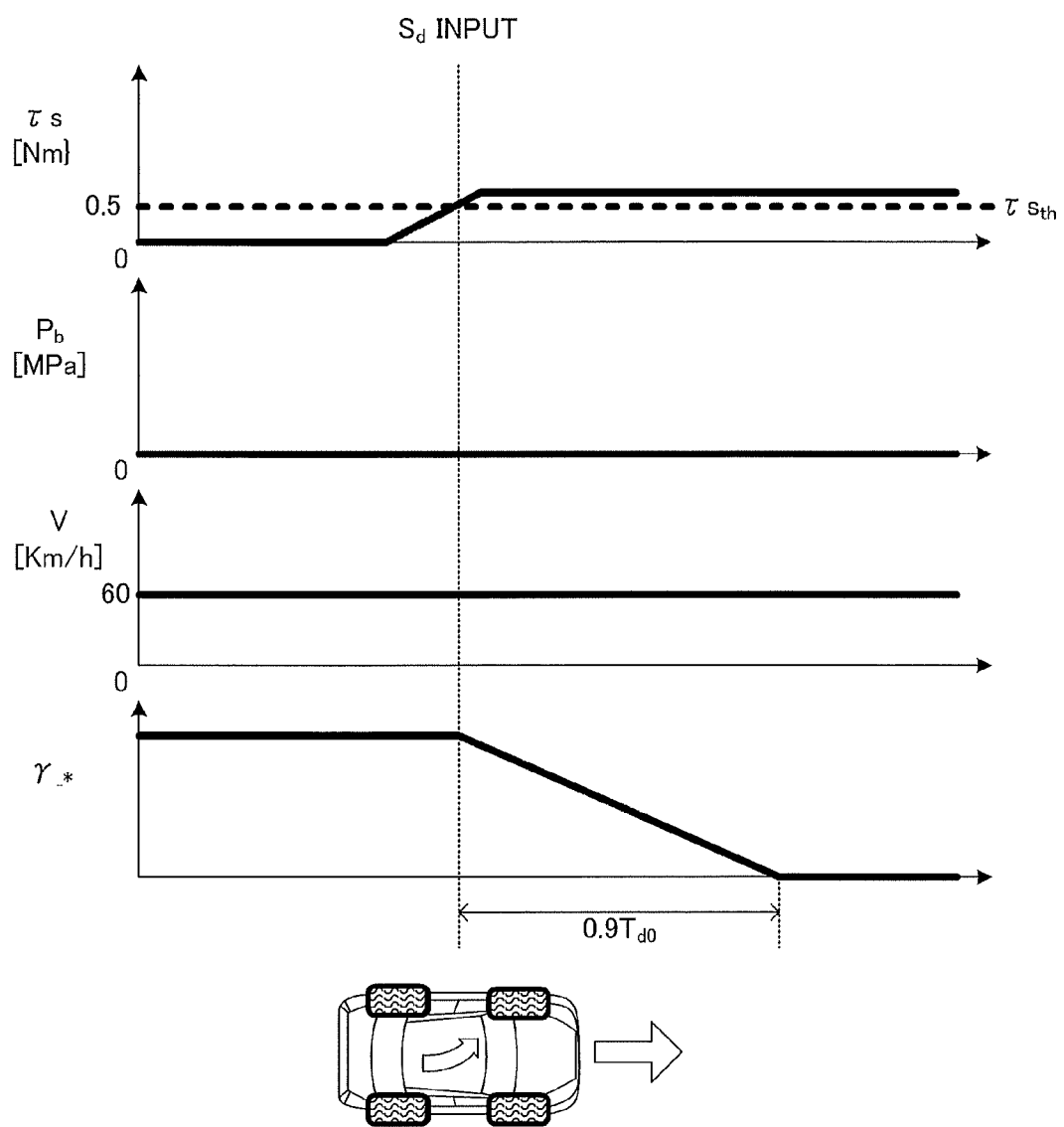
FIG. 16 is a diagram illustrating another example of the change in the yaw rate degeneration control amount in the degeneration control according to the second embodiment.

Referring to FIG. 16, the degeneration request signal $S_d$ is inputted when the steering torque τs exceeds the threshold value τ$s_{th}$ (0.5 Nm), which is set to relatively low. At the time when the degeneration request signal $S_d$ is inputted (the degeneration control is started), the steering torque τs is 0.5 (Nm), the braking pressure $P_b$ is 0 (MPa), and the vehicle speed V is 60 Km/h. In this case, the steering torque score Q_τs is 0.9, the braking force score Q_$P_b$ is 1, and the vehicle speed score Q_V is also 1. Therefore, the total score Q_Total is 0.9, that is, the degeneration time $T_d$ is 0.9 times the reference degeneration time $T_{d0}$. When the steering torque τs thus exceeds the low threshold value τ$s_{th}$ and the vehicle travels at low speed with no braking force acting thereon, the margin-of-steering ratio at the start of the degeneration control is relatively high and thus the degeneration time $T_d$ is set to relatively long.

Figure 17:
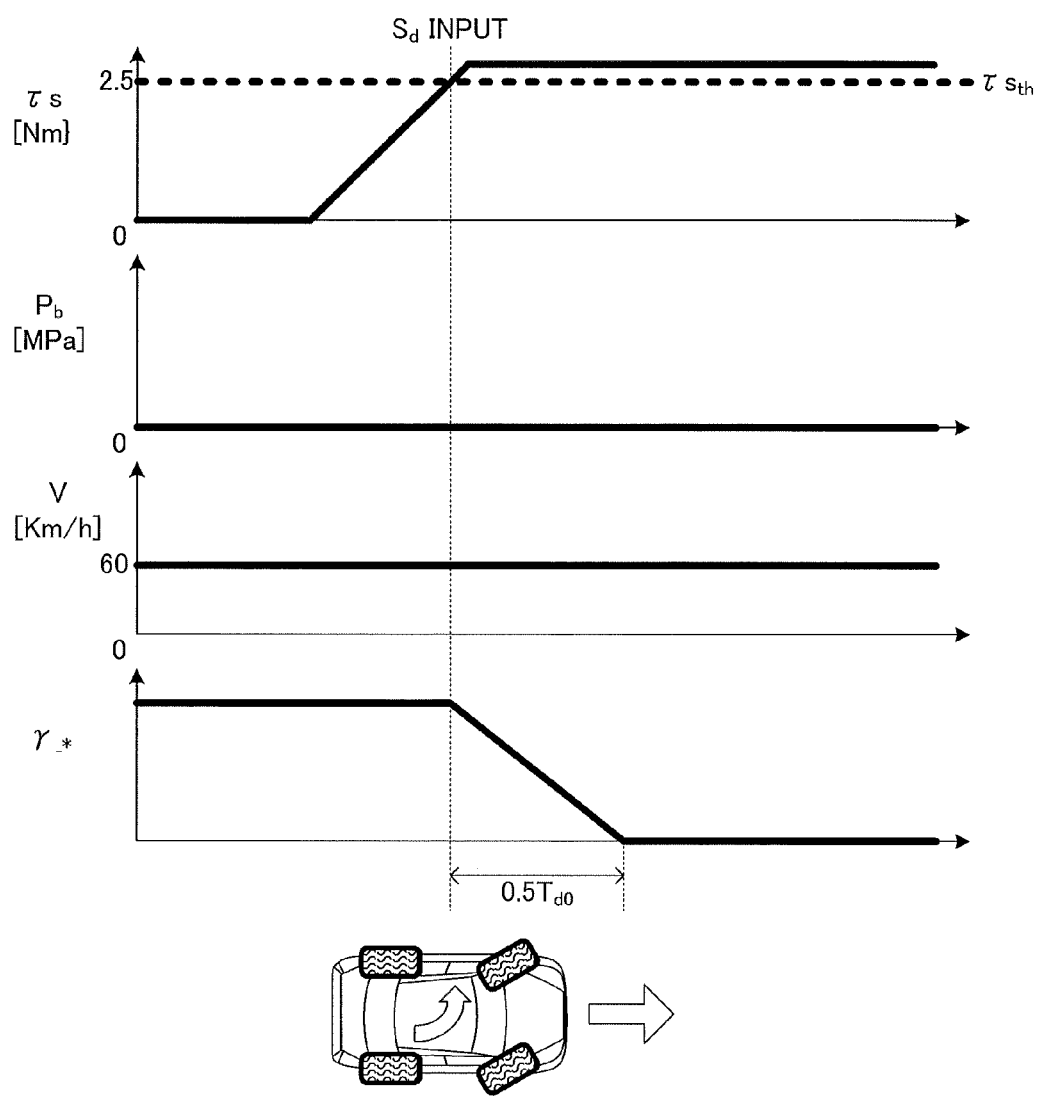
FIG. 17 is a diagram illustrating still another example of the change in the yaw rate degeneration control amount in the degeneration control according to the second embodiment.

Referring to FIG. 17, the degeneration request signal $S_d$ is inputted when the steering torque τs exceeds the threshold value τ$s_{th}$ (2.5 Nm), which is set to high. At the time when the degeneration request signal $S_d$ is inputted (the degeneration control is started), the steering torque τs is 2.5 (Nm), the braking pressure $P_b$ is 0 (MPa), and the vehicle speed V is 60 Km/h. In this case, the steering torque score Q_τs is 0.5, the braking force score Q_$P_b$ is 1, and the vehicle speed score Q_V is also 1. Therefore, the total score Q_Total is 0.5, that is, the degeneration time $T_d$ is 0.5 times the reference degeneration time $T_{d0}$. When the steering torque τs exceeds the high threshold value in this manner, there is a possibility of an emergency occurring during yaw rate control (automatic steering) by the lateral motion control apparatus 40 for some reason and thus the margin-of-steering ratio at the start of the degeneration control is slightly low. In this case, the degeneration time $T_d$ is set to relatively short accordingly.

Figure 18:
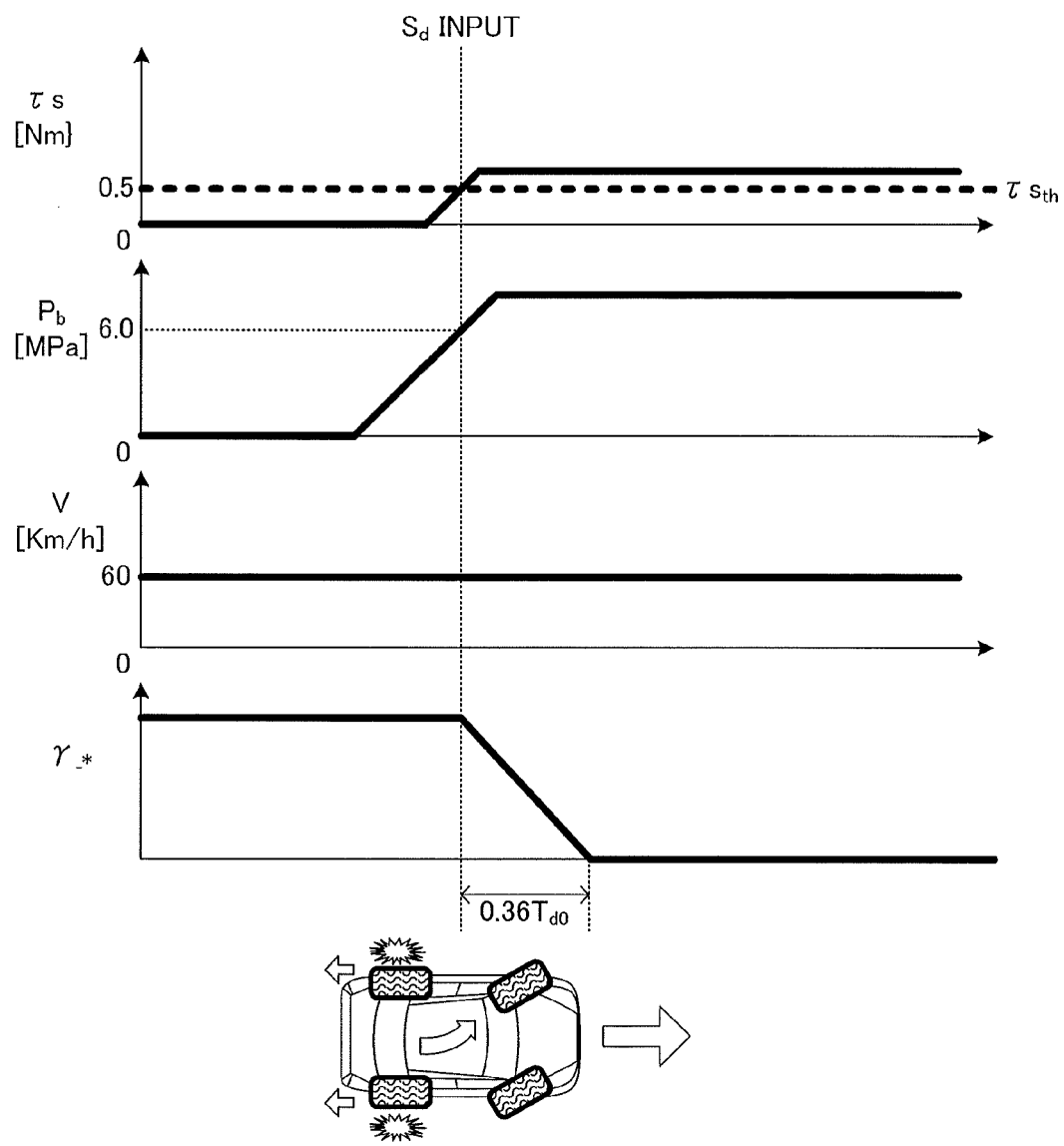
FIG. 18 is a diagram illustrating another example of the change in the yaw rate degeneration control amount in the degeneration control according to the second embodiment.

Referring to FIG. 18, the degeneration request signal $S_d$ is inputted when the steering torque τs exceeds the threshold value τ$s_{th}$ (0.5 Nm), which is set to relatively low. At the time when the degeneration request signal $S_d$ is inputted (the degeneration control is started), the steering torque τs is 0.5 (Nm), the braking pressure $P_b$ is 6.0 (MPa), and the vehicle speed V is 60 Km/h. In this case, the steering torque score Q_τs is 0.9, the braking force score Q_$P_b$ is 0.4, and the vehicle speed score Q_V is 1. Therefore, the total score Q_Total is 0.36, that is, the degeneration time $T_d$ is 0.36 times the reference degeneration time $T_{d0}$. When the steering torque τs thus exceeds the threshold value and a relatively strong braking force acts on the vehicle, there is a relatively high possibility of an emergency occurring during yaw rate control by the lateral motion control apparatus 40 for some reason and thus the margin-of-steering ratio at the start of the degeneration control is low. In this case, the degeneration time $T_d$ is set to short accordingly.

Figure 19:
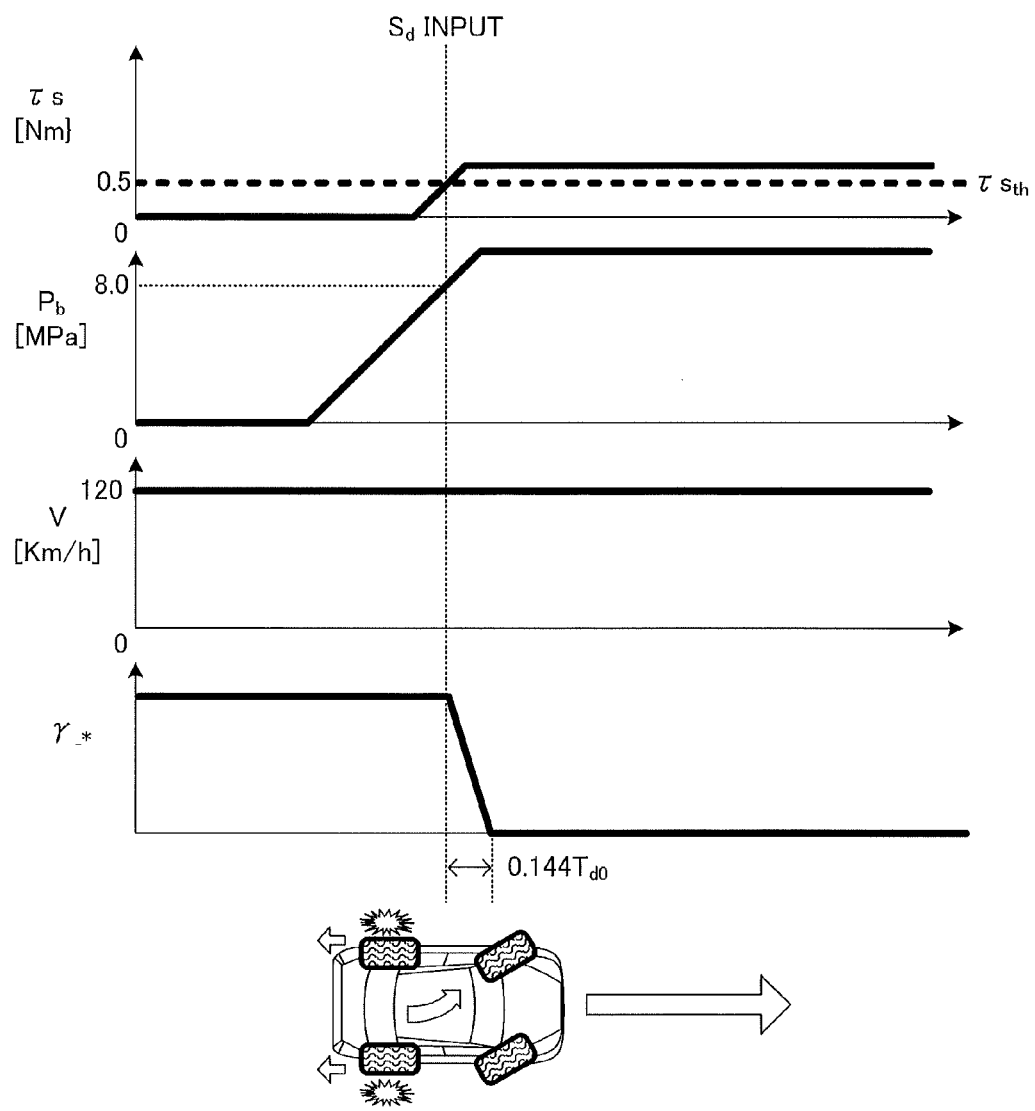
FIG. 19 is a diagram illustrating another example of the change in the yaw rate degeneration control amount in the degeneration control according to the second embodiment.

Referring to FIG. 19, the degeneration request signal $S_d$ is inputted when the steering torque τs exceeds the threshold value τ$s_{th}$ (0.5 Nm), which is set to relatively low. At the time when the degeneration request signal $S_d$ is inputted (the degeneration control is started), the steering torque τs is 0.5

(Nm), the braking pressure $P_b$ is 8.0 (MPa), and the vehicle speed V is 120 Km/h. In this case, the steering torque score $Q\_\tau s$ is 0.9, the braking force score $Q\_P_b$ is 0.2, and the vehicle speed score $Q\_V$ is 0.8. Therefore, the total score $Q\_Total$ is 0.144, that is, the degeneration time $T_d$ is 0.144 times the reference degeneration time $T_{d0}$. When the steering torque $\tau s$ thus exceeds the threshold value and a strong braking force acts on the vehicle and further the vehicle travels at high speed, there is a high possibility of an emergency occurring during yaw rate control by the lateral motion control apparatus 40 for some reason and thus the margin-of-steering ratio at the start of the degeneration control is extremely low. In this case, the degeneration time $T_d$ is set to extremely short accordingly.

According to the second embodiment above, since the amount representing the degeneration rate (degeneration time $T_d$) is set based on the margin-of-steering ratio, the control amount of yaw rate for each actuator can degenerate in view of the margin-of-steering ratio. In addition, since the degeneration time $T_d$ is set such that the greater the margin-of-steering ratio becomes, the less the degeneration rate becomes, the degeneration control is less time-consuming in the case that the margin-of-steering ratio is low, whereas more time-consuming in the case that the margin-of-steering ratio is high. This allows the steering operation to be left rapidly and entirely to the driver in the case that the margin-of-steering ratio is low, which results in an increase in the travelling safety. Meanwhile, the control amount for the control target degenerates in a time-consuming manner in the case that the margin-of-steering ratio is high. Therefore, it is possible to further reduce a sense of discomfort due to the stop of lateral motion by the lateral motion control apparatus.

According to the first and second embodiments above, when it is determined to stop the control for each actuator arranged to be controlled to change the lateral motion amount of the vehicle, the degeneration control amount determination unit 4162*b* determines a degeneration control amount for each actuator. Based on the determined degeneration control amount, the control target is then controlled until each actuator is stopped. Since the degeneration period is provided in this manner, it is possible to prevent immediate stop of the control for each actuator. Therefore, it is possible to stop the lateral motion control while stabilizing the behavior of a vehicle.

Exemplary embodiments have been described thus far. According to these embodiments, a lateral motion control apparatus (40) includes: a target value obtaining unit (411) that obtains a target value ($\gamma^*$) for a lateral motion amount of a vehicle; a control amount calculation unit (414, 415, 416) that calculates a control amount for a control target (14, 22, 32) controlled so as to change the lateral motion amount of the vehicle based on the target value of the lateral motion amount obtained by the target value obtaining unit; a control target control unit (42, 43, 44) that controls the control target based on the control amount; a control stop determination unit (417, 4162*a*) that determines whether or not to stop the control for the control target by the control target control unit based on a steering operation amount ($\tau s$) inputted by a driver of the vehicle; and a degeneration control amount determination unit (4162*b*) that determines a degeneration control amount for the control target such that the control amount for the control target degenerates after the time when the control stop determination unit has determined that the control for the control target is to be stopped. And when the control stop determination unit has determined that the control for the control target is to be stopped, the control target control unit controls the control target based on the degeneration control amount determined by the degeneration control amount determination unit.

According to the embodiments, when the control stop determination unit determines to stop the control for the control target controlled in order to change the lateral motion amount of the vehicle, the degeneration control amount determination unit determines the degeneration control amount for the control target. Based on the determined degeneration control amount, the control target is controlled until the control target is stopped. That is, a degeneration period for degeneration of the control amount for the control target is provided between the time when the control stop determination unit determines to stop the control for the control target and the time when the control for the control target is stopped. Degeneration of the control amount for the control target during this degeneration period can prevent the control for the control target from being stopped immediately. It is thus possible to stop the lateral motion control while stabilizing the behavior of a vehicle.

In the disclosure, "degeneration" means gradually reducing the control amount for the control target to zero. Accordingly, in such a case where the control target is controlled based on the degeneration control amount determined by the degeneration control amount determination unit after it is determined to stop the control for the control target (such control is herein referred to as degeneration control), the control for the control target cannot be stopped immediately.

It is preferable for the degeneration control amount determination unit to include a degeneration rate setting unit (S35, S48) that sets an amount representing the rate of change of the degeneration control amount (degeneration rate $V_d$ or degeneration time $T_d$) such that the rate of change of the degeneration control amount changes in accordance with the steering operation amount inputted by the driver. It is preferable for the degeneration control amount determination unit to be arranged to then determine the degeneration control amount based on the amount representing the rate of change of the degeneration control amount set in the degeneration rate setting unit. In this case, it is preferable for the degeneration rate setting unit to be arranged to set the amount representing the rate of change of the degeneration control amount such that the greater the rate of change of the steering operation amount inputted by the driver becomes, the greater the rate of change of the degeneration control amount becomes.

When the rate of change of the steering operation amount inputted by the driver is large, it is highly possible that the driver performs a steering operation based on his/her own intent. In this case, reducing obstruction to the steering operation by the driver due to degeneration control should take priority over reducing through degeneration control a sense of discomfort at the time of stopping the vehicle lateral motion control. Meanwhile, when the rate of change of the steering operation amount inputted by the driver is small, it is unclear whether or not the driver performs a steering operation based on his/her own intent. In this case, reducing through degeneration control a sense of discomfort at the time of stopping the vehicle lateral motion control should take priority over reducing obstruction to the steering operation by the driver due to degeneration control.

According to the disclosure, the degeneration rate is determined such that the greater the rate of change of the steering operation amount inputted by the driver becomes, the greater the rate of change of the degeneration control amount (degeneration rate) for the control target becomes, and the degeneration control amount is determined based on the determined degeneration rate in this manner. Accordingly, when the rate of change of the steering operation amount during degeneration control is large, the degeneration rate is set to high and thereby the degeneration control terminates in a short period of time. This can reduce obstruction to the steering operation by the driver due to degeneration control. Meanwhile, when the rate of change of the steering operation amount during degeneration control is low, the degeneration control is relatively time-consuming. This can further reduce a sense of discomfort that occurs when stopping the vehicle lateral motion control.

It is preferable that the "steering operation amount" is an amount reflecting the intent to steer by the driver. For example, it is preferable that the steering operation amount is the steering torque inputted by the driver through a steering wheel. The steering operation amount may be the steering angle of the steering wheel, the steering (turning) angle of a wheel (front wheels), or the angular speeds thereof as long as reflecting the intent to steer by the driver. The "amount representing the rate of change of the degeneration control amount" is only required to eventually represent the degeneration rate. For example, the amount may be the degeneration rate itself, the degeneration time (until the degeneration control amount becomes zero after the degeneration control is started), or the degeneration range (the vehicle travels until the degeneration control amount becomes zero after the degeneration control is started).

It is preferable for the degeneration control amount determination unit to include a margin-of-steering ratio calculation unit (S47) that calculates, based on the steering operation amount inputted by the driver and traveling conditions of the vehicle, a margin-of-steering ratio representing the magnitude of a temporal margin until the steering operation is left entirely to the driver after the time when the control stop determination unit determines to stop the control for the control target, that is, representing the length of time during which degeneration control is required. It is preferable for the degeneration rate setting unit (S48) to be arranged to then set the amount representing the rate of change of the degeneration control amount (e.g. degeneration time) based on the margin-of-steering ratio calculated in the margin-of-steering ratio calculation unit. In this case, it is preferable for the degeneration rate setting unit to be arranged to set the amount representing the rate of change of the degeneration control amount such that the greater the margin-of-steering ratio becomes, the less the rate of change of the degeneration control amount becomes.

Upon starting degeneration control, it is possible to estimate the magnitude of a temporal margin until the steering operation is left entirely to the driver after the start of the degeneration control (margin-of-steering ratio) based on the steering operation amount by the driver (or the amount of change in the steering operation amount) and/or the conditions of the vehicle at the time (when the control stop determination unit determines to stop the control over the control target). For example, in the case that a strong braking force acts on the vehicle at the start of the degeneration control, there is a possibility of an emergency occurring for some reason and thus the steering operation needs to be left rapidly to the driver. In this case, the margin-of-steering ratio is low accordingly. Meanwhile, in the case that the vehicle travels straight at low speed and no braking force acts on the vehicle at the start of the degeneration control, there is only a small possibility of an emergency and thus the margin-of-steering ratio is high accordingly.

According to the disclosure, since the amount representing the degeneration rate is set based on the margin-of-steering ratio, it is possible to degenerate the control amount for the control target in view of the margin-of-steering ratio. In addition, since the amount representing the degeneration rate is set such that the greater the margin-of-steering ratio becomes, the less the degeneration rate becomes, the degeneration control is less time-consuming when the margin-of-steering ratio is low, while more time-consuming when the margin-of-steering ratio is high. This allows the steering operation to be left rapidly and entirely to the driver when the margin-of-steering ratio is low, which results in an increase in the travelling safety. Meanwhile, the control amount for the control target degenerates in a time-consuming manner when the margin-of-steering ratio is high. This can further reduce a sense of discomfort at the time of stopping lateral motion by the lateral motion control apparatus.

It is preferable for the margin-of-steering ratio calculation unit to include a steering operation amount score calculation unit (S44) that calculates a steering operation amount score ($Q\_\tau s$) that varies depending on the steering operation amount, a braking force score calculation unit (S45) that calculates a braking force score ($Q\_P_b$) that varies depending on the magnitude of a braking force acting on the vehicle, and a vehicle speed score calculation unit (S46) that calculates a vehicle speed score ($Q\_V$) that varies depending on the magnitude of a vehicle speed. It is preferable for the degeneration rate setting unit to be arranged to then calculate the margin-of-steering ratio based on the steering operation amount score ($Q\_\tau s$), the braking force score ($Q\_P_b$), the vehicle speed score ($Q\_V$), and a preset reference value ($T_{d0}$) of the amount representing the rate of change of the degeneration control amount. It is more preferable for the margin-of-steering ratio calculation unit to be arranged to calculate a total score ($Q\_Total$) by multiplying the steering operation amount score ($Q\_\tau s$) by the braking force score ($Q\_P_b$) and the vehicle speed score ($Q\_V$). It is preferable for the degeneration rate setting unit to be arranged to then determine the amount representing the rate of change of the degeneration control amount by weighting the reference value ($T_{d0}$) with the total score ($Q\_Total$).

According to the arrangement above, the margin-of-steering ratio is calculated based on the steering operation amount by the driver (e.g. steering torque) and the magnitude of a braking force and a vehicle speed that represents the traveling conditions of the vehicle. Also, the degeneration control amount is determined based on the calculated margin-of-steering ratio and the preset reference value of the amount representing the rate of change of the degeneration control amount. Based on the determined degeneration control amount in this manner, degeneration control for the control target in accordance with the margin-of-steering ratio is performed.

The present invention is not intended to be limited to the aforementioned embodiments. For example, although the embodiments above describe the case where the yaw rate degeneration control amount $\gamma_{d\_*}$ changes linearly during degeneration control, the yaw rate degeneration control amount $\gamma_{d\_*}$ may approach zero asymptotically by applying low-pass filtering to the yaw rate control amount $\gamma_{\_*}$. Although the second embodiment describes the case where the margin-of-steering ratio that is estimated from the steering operation amount by the driver at the start of the degeneration control is represented by the steering torque-related score (steering torque score), the ratio may be represented by a steering angle-related score (steering angle score), a steering angle speed-related score (steering angle velocity score), or a steering torque change rate-related score (steering torque change rate score). Although the second embodiment describes the case where the margin-of-steering ratio that is estimated from the traveling conditions of the vehicle at the start of the degeneration control is represented by the braking pressure-related score and the vehicle speed-related score, the ratio may be represented by another parameter (e.g. a yaw rate-related score, a back-and-forth acceleration-related score, or a lateral acceleration-related score). Further, in the second embodiment above, the degeneration time $T_d$ is used for representing the rate of change of the degeneration control amount, the degeneration rate can be used for representing the rate of change of the degeneration control amount as described in the first embodiment above, or a degeneration range (the vehicle travels from the beginning to the end of the degeneration control) can be used for representing the rate of change of the degeneration control amount. Furthermore, although the DYC actuator is an actuator that imparts a braking force on the vehicle wheels (that is, is a braking actuator) in the aforementioned embodiments, the DYC actuator may be an actuator that imparts a driving force on the vehicle wheels (that is, an in-wheel motor). In this manner, the present invention may be varied as long as such variations do not depart from the scope of the invention.

The invention claimed is:

1. A lateral motion control apparatus for a vehicle comprising;
  a target value obtaining unit that obtains a target value for a lateral motion amount of a vehicle;
  a control amount calculation unit that calculates a control amount for controlling a control target so as to change the lateral motion amount of the vehicle based on the target value of the lateral motion amount obtained by the target value obtaining unit;
  a control target control unit that controls the control target based on the control amount;
  a control stop determination unit that determines whether or not to stop the control of the control target by the control target control unit based on a steering operation amount inputted by a driver of the vehicle; and
  a degeneration control amount determination unit that determines a degeneration control amount for controlling the control target such that the control amount for the control target degenerates after the time when the control stop determination unit has determined that the control of the control target is to be stopped,
  wherein, when the control stop determination unit has determined that the control of the control target is to be stopped, the control target control unit controls the control target based on the degeneration control amount determined by the degeneration control amount determination unit.

2. The lateral motion control apparatus for a vehicle according to claim 1, wherein
  the degeneration control amount determination unit comprises a degeneration rate setting unit that sets an amount representing the rate of change of the degeneration control amount per unit time such that the rate of change of the degeneration control amount per unit time changes in accordance with the steering operation amount inputted by the driver, and the degeneration control amount determination unit determines the degeneration control amount based on the amount representing the rate of change of the degeneration control amount per unit time set in the degeneration rate setting unit.

3. The lateral motion control apparatus for a vehicle according to claim 2, wherein
  the degeneration rate setting unit sets the amount representing the rate of change of the degeneration control amount per unit time such that the greater the rate of change of the steering operation amount per unit time inputted by the driver becomes, the greater the rate of change of the degeneration control amount per unit time becomes.

4. The lateral motion control apparatus for a vehicle according to claim 2, wherein
  the degeneration control amount determination unit comprises a margin-of-steering ratio calculation unit that calculates, based on the steering operation amount inputted by the driver and traveling conditions of the vehicle, a margin-of-steering ratio representing the magnitude of a temporal margin until the steering operation is left entirely to the driver after the time when the control stop determination unit determines to stop the control of the control target, and wherein
  the degeneration rate setting unit sets the amount representing the rate of change of the degeneration control amount per unit time based on the margin-of-steering ratio calculated in the margin-of-steering ratio calculation unit.

5. The lateral motion control apparatus for a vehicle according to claim 4, wherein
  the degeneration rate setting unit sets the amount representing the rate of change of the degeneration control amount per unit time such that the greater the margin-of-steering ratio becomes, the less the rate of change of the degeneration control amount per unit time becomes.

6. The lateral motion control apparatus for a vehicle according to claim 5, wherein
  the margin-of-steering ratio calculation unit comprises any one or more of a steering operation amount score calculation unit that calculates a steering operation amount score that varies depending on the steering operation amount, a braking force score calculation unit that calculates a braking force score that varies depending on the magnitude of a braking force acting on the vehicle, and a vehicle speed score calculation unit that calculates a vehicle speed score that varies depending on the magnitude of a vehicle speed, and wherein
  the degeneration rate setting unit calculates the margin-of-steering ratio based on any one or more of the steering operation amount score calculated in the steering operation amount score calculation unit, the braking force score calculated in the braking force score calculation unit, and the vehicle speed score calculated in the vehicle speed score calculation unit, as well as a preset reference value of the amount representing the rate of change of the degeneration control amount per unit time.

7. The lateral motion control apparatus for a vehicle according to claim 6, wherein
  the steering operation amount score represents the margin-of-steering ratio estimated from the magnitude of steering torque,
  the braking force score represents the margin-of-steering ratio estimated from the magnitude of the braking force, and
  the vehicle speed score represents the margin-of-steering ratio estimated from the magnitude of the vehicle speed.

8. The lateral motion control apparatus for a vehicle according to claim 1, wherein
  the degeneration control amount determination unit determines the degeneration control amount for controlling the control target to gradually reduce the control amount for the control target to zero.

* * * * *